(12) United States Patent　　　(10) Patent No.: US 11,790,537 B2
Ishikake　　　(45) Date of Patent: Oct. 17, 2023

(54) TRACKING DEVICE, ENDOSCOPE SYSTEM, AND TRACKING METHOD

(71) Applicant: OLYMPUS CORPORATION, Hachioji (JP)

(72) Inventor: Makoto Ishikake, Tokyo (JP)

(73) Assignee: OLYMPUS CORPORATION, Hachioji (JP)

( * ) Notice: Subject to any disclaimer, the term of this patent is extended or adjusted under 35 U.S.C. 154(b) by 137 days.

(21) Appl. No.: 17/179,919

(22) Filed: Feb. 19, 2021

(65) Prior Publication Data

US 2021/0174518 A1　　Jun. 10, 2021

Related U.S. Application Data

(63) Continuation of application No. PCT/JP2019/013607, filed on Mar. 28, 2019.

(51) Int. Cl.
　　*G06T 7/246*　　(2017.01)
(52) U.S. Cl.
　　CPC .... *G06T 7/246* (2017.01); *G06T 2207/10016* (2013.01); *G06T 2207/10068* (2013.01); *G06T 2207/20081* (2013.01); *G06T 2207/20212* (2013.01)
(58) Field of Classification Search
　　CPC ........... G06T 7/246; G06T 2207/10016; G06T 2207/10068; G06T 2207/20081; G06T 2207/20212
See application file for complete search history.

(56) References Cited

U.S. PATENT DOCUMENTS

| | | | |
|---|---|---|---|
| 5,764,283 A | 6/1998 | Pingali et al. |
| 5,999,651 A | 12/1999 | Chang et al. |
| 6,259,802 B1 | 7/2001 | Jolly et al. |
| 6,546,117 B1 | 4/2003 | Sun et al. |
| 6,678,416 B1 | 1/2004 | Sun et al. |
| 6,912,310 B1 | 6/2005 | Park et al. |
| 6,937,760 B2 | 8/2005 | Schoepflin et al. |

(Continued)

FOREIGN PATENT DOCUMENTS

| | | |
|---|---|---|
| CN | 101477690 A | 7/2009 |
| CN | 105761277 A | 7/2016 |

(Continued)

OTHER PUBLICATIONS

International Search Report dated Jun. 18, 2019, issued in counterpart International Application No. PCT/JP2019/013606, with English Translation. (4 pages).

(Continued)

*Primary Examiner* — Amara Abdi
(74) *Attorney, Agent, or Firm* — WHDA, LLP

(57) ABSTRACT

A tracking device includes a processor including hardware. The processor is configured to: set a start frame and an end frame in a video including multiple frames; perform forward tracking in frames subsequent to the start frame based on a region of a tracking target in the start frame; perform backward tracking in frames previous to the end frame based on a region of the tracking target in the end frame; and generate a combined mask image by combining a forward mask image based on the forward tracking with a backward mask image based on the backward tracking.

20 Claims, 22 Drawing Sheets

(56) References Cited

U.S. PATENT DOCUMENTS

| | | | |
|---|---|---|---|
| 9,478,033 B1* | 10/2016 | Safreed | G06T 7/251 |
| 2003/0171668 A1 | 9/2003 | Tsujino et al. | |
| 2004/0208341 A1 | 10/2004 | Zhou et al. | |
| 2006/0008138 A1 | 1/2006 | Zhou et al. | |
| 2006/0262960 A1 | 11/2006 | Le Clerc et al. | |
| 2008/0100709 A1* | 5/2008 | Furukawa | G01S 3/7864 |
| | | | 348/169 |
| 2011/0052071 A1* | 3/2011 | Iwamoto | G06T 7/12 |
| | | | 382/190 |
| 2011/0158474 A1 | 6/2011 | Srikrishnan et al. | |
| 2011/0158484 A1 | 6/2011 | Mader | |
| 2012/0114173 A1 | 5/2012 | Ikenoue | |
| 2014/0010409 A1 | 1/2014 | Yamashita | |
| 2016/0055648 A1 | 2/2016 | Liu et al. | |
| 2017/0111585 A1 | 4/2017 | Schlattmann et al. | |
| 2017/0251998 A1* | 9/2017 | Maeda | A61B 8/461 |
| 2018/0146002 A1 | 5/2018 | Canfield | |
| 2018/0259608 A1 | 9/2018 | Golden et al. | |
| 2019/0197703 A1 | 6/2019 | Wang et al. | |
| 2020/0074673 A1 | 3/2020 | Gupta et al. | |
| 2020/0160540 A1 | 5/2020 | Rastgar | |
| 2020/0226781 A1 | 7/2020 | Ma et al. | |
| 2020/0279373 A1 | 9/2020 | Hussain et al. | |
| 2021/0196101 A1* | 7/2021 | Usuda | G06V 10/25 |

FOREIGN PATENT DOCUMENTS

| | | |
|---|---|---|
| JP | 2002-230548 A | 8/2002 |
| JP | 2003-250804 A | 9/2003 |
| JP | 2005-160688 A | 6/2005 |
| JP | 2007-222533 A | 9/2007 |
| JP | 2009/037518 A | 2/2009 |
| JP | 2016-55040 A | 4/2016 |
| JP | 6055565 B1 | 12/2016 |
| WO | 2004/081875 A2 | 9/2004 |
| WO | 2017/011833 A1 | 1/2017 |
| WO | 2017/091833 A1 | 6/2017 |
| WO | 2017/158897 A1 | 9/2017 |

OTHER PUBLICATIONS

International Search Report dated Jun. 18, 2019, issued in counterpart International Application No. PCT/JP2019/013607, with English Translation (4 pages).
Related Co-pending U.S. Appl. No. 17/179,903.
Non-Final Office Action dated Aug. 18, 2023, issued in U.S. Appl. No. 17/179,903 (18 pages.

* cited by examiner

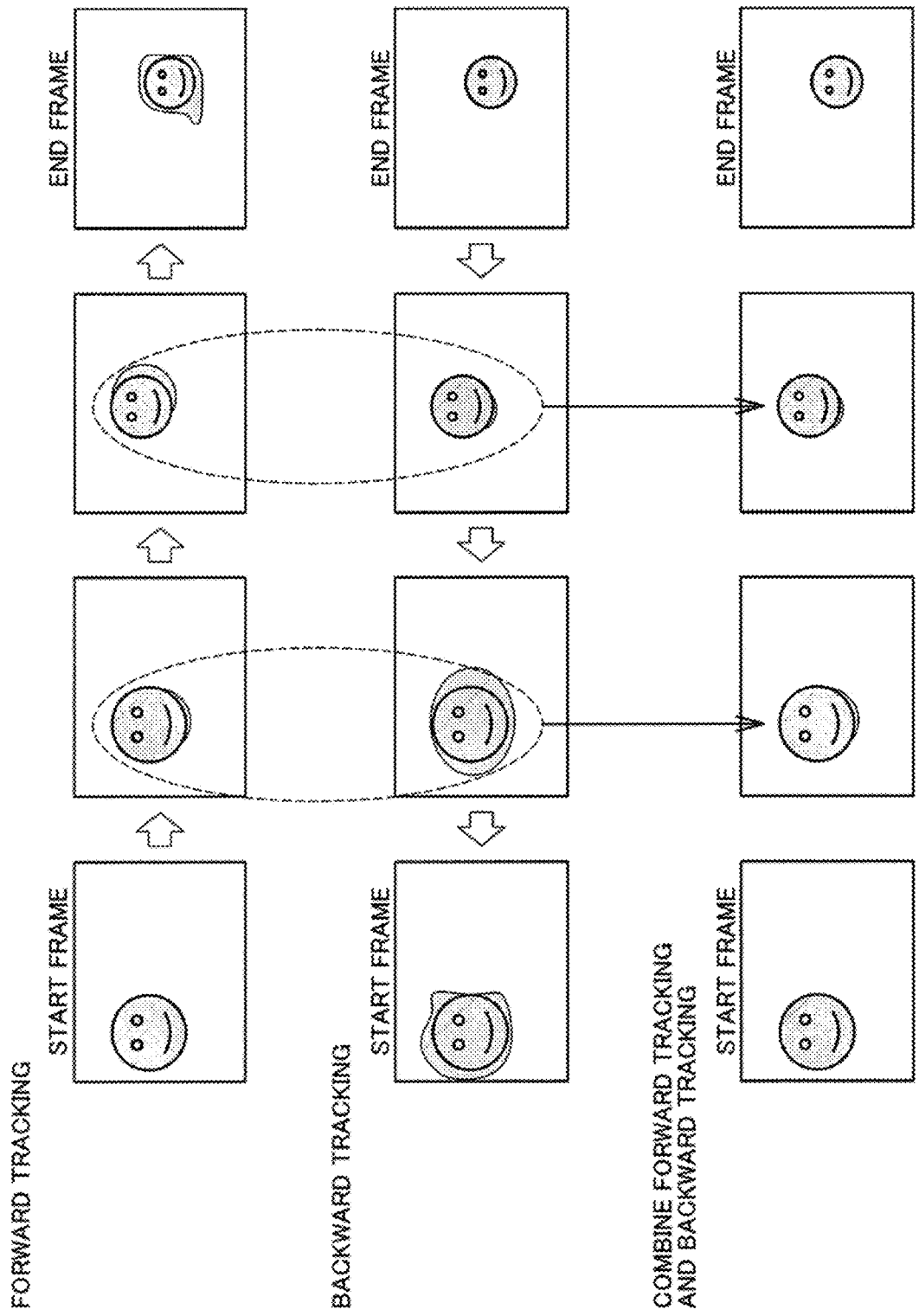

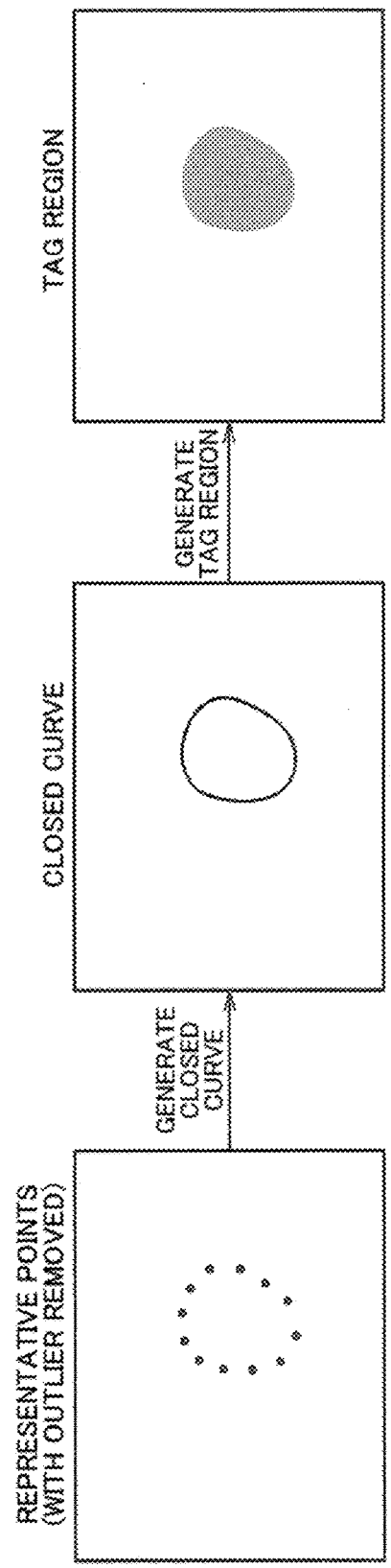

FIG. 14
BEFORE ANNOTATION
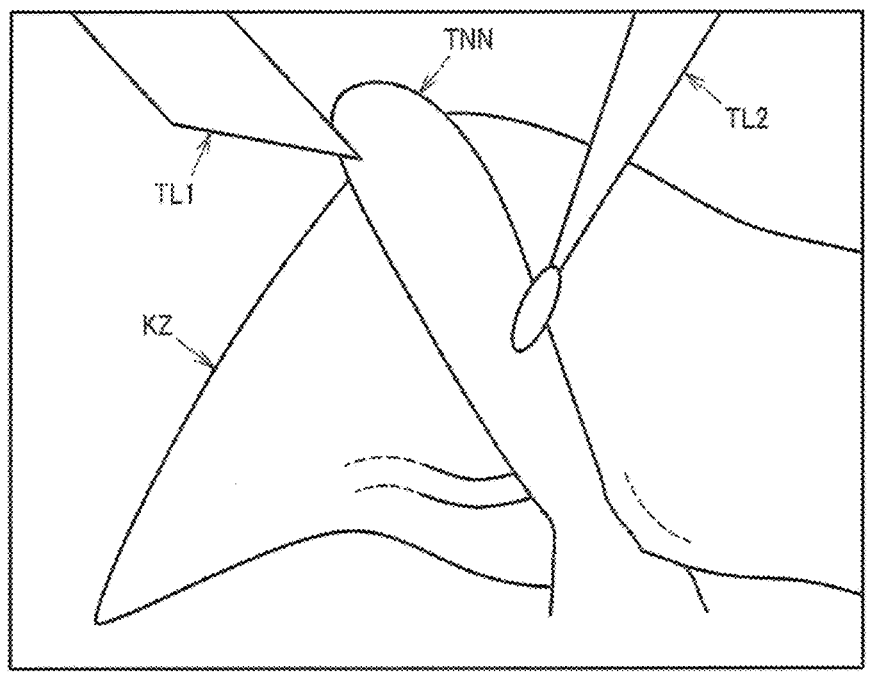
AFTER ANNOTATION
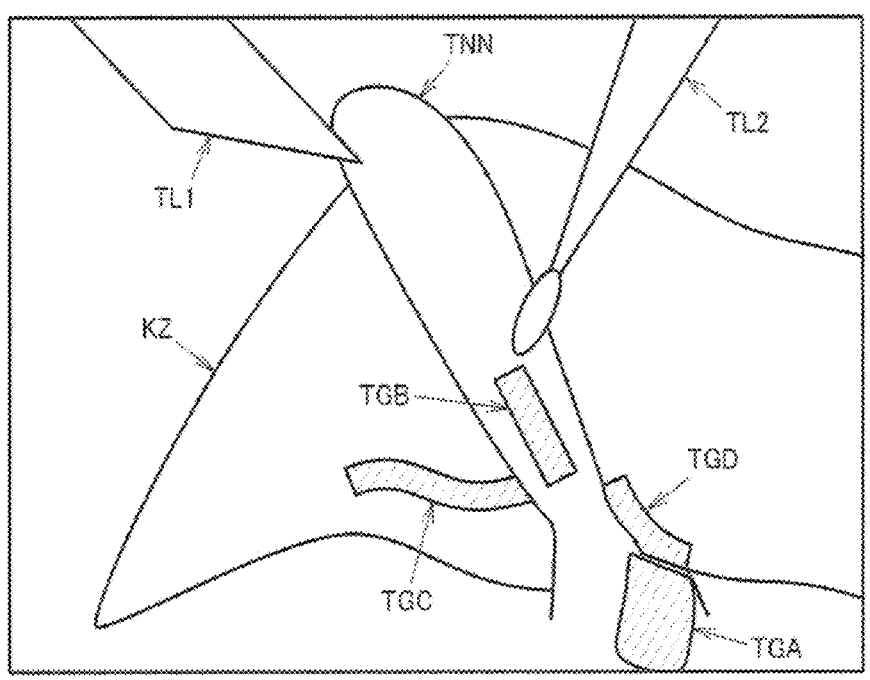

TRACKING DEVICE, ENDOSCOPE SYSTEM, AND TRACKING METHOD

CROSS REFERENCE TO RELATED APPLICATION

This application is a continuation of International Patent Application No. PCT/JP2019/013607, having an international filing date of Mar. 28, 2019, which designated the United States, the entirety of which is incorporated herein by reference.

BACKGROUND

A method of estimating a position of a specified target in each frame image included in a video has been known. Hereinafter, this method is referred to as tracking, and the specified target is referred to as a tracking target. The tracking is, in other words, a method of tracking how the tracking target has moved across multiple frame images.

For example, Japanese Unexamined Patent Application Publication No. 2005-160688 discloses a method of tracking coordinates of a specified portion in a diagnostic video in forward and backward directions and then combining the tracked coordinates.

SUMMARY

In accordance with one of some aspect, a tracking device comprising: a processor including hardware, the processor being configured to: set a start frame and an end frame in a video including multiple frames; perform forward tracking of tracking a tracking target in a forward direction in frames subsequent to the start frame based on a region of the tracking target in the start frame; perform backward tracking of tracking the tracking target in a backward direction in frames previous to the end frame based on a region of the tracking target in the end frame; and generate a combined mask image indicating a region of the tracking target in each of the frames in which the forward tracking and the backward tracking have been performed by combining a forward mask image based on the forward tracking with a backward mask image based on the backward tracking.

In accordance with one of some aspect, there is provided an endoscope system comprising: a memory storing a trained model; an endoscopic scope configured to capture a detection image; and a processor configured to receive the detection image as input and detect a position of a given subject in the detection image using the trained model, wherein the trained model is trained by machine learning based on training data in which a combined mask image is associated with an image of each of multiple frames included in a video, the combined mask image being generated by: setting a start frame and an end frame in the video including the multiple frames; performing forward tracking of tracking a tracking target in a forward direction in frames subsequent to the start frame based on a region of the tracking target in the start frame; performing backward tracking of tracking the tracking target in a backward direction in frames previous to the end frame based on a region of the tracking target in the end frame; and generating the combined mask image indicating a region of the tracking target in each of the frames in which the forward tracking and the backward tracking have been performed by combining a forward mask image based on the forward tracking with a backward mask image based on the backward tracking.

In accordance with one of some aspect, there is provided a tracking method comprising: setting a start frame and an end frame in a video including multiple frames; performing forward tracking of tracking a tracking target in a forward direction in frames subsequent to the start frame based on a region of the tracking target in the start frame; performing backward tracking of tracking the tracking target in a backward direction in frames previous to the end frame based on a region of the tracking target in the end frame; and generating a combined mask image indicating a region of the tracking target in each of the frames in which the forward tracking and the backward tracking have been performed by combining a forward mask image based on the forward tracking with a backward mask image based on the backward tracking.

BRIEF DESCRIPTION OF THE DRAWINGS

FIG. 3 illustrates an example of a forward mask image, a backward mask image, and a combined mask image.

FIG. 11 explains a process of generating a tag region based on representative points.

FIG. 14 illustrates an example of annotation.

DESCRIPTION OF EXEMPLARY EMBODIMENTS

Figure 1:
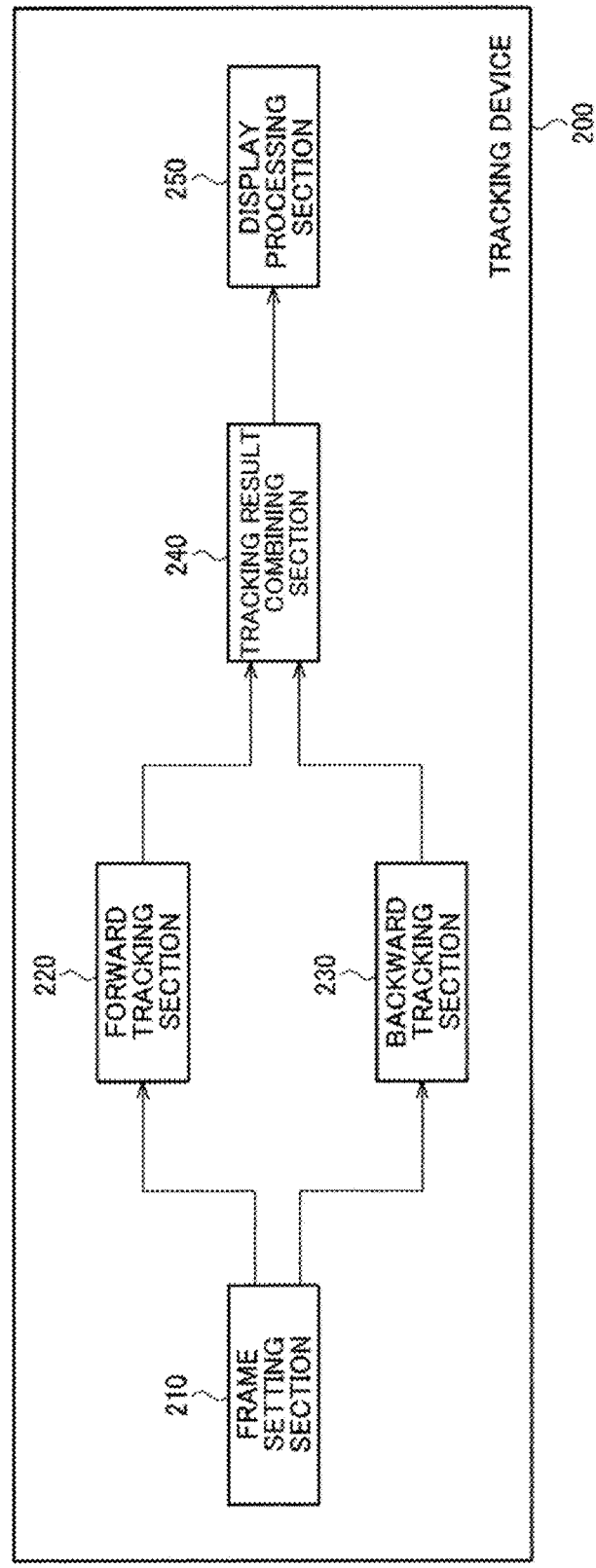
FIG. 1 illustrates a configuration example of a tracking device.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

Exemplary embodiments are described below. Note that the following exemplary embodiments do not in any way limit the scope of the content defined by the claims laid out herein. Note also that all of the elements described in the present embodiment should not necessarily be taken as essential elements.

1. Overview

Tracking of a tracking target in a video has been a widely used technique. For example, machine learning for object recognition in images requires numerous images appended with tags. Hereinafter, each image appended with a tag(s) is referred to as a tagged image. Creating tagged images requires time-consuming manual work. In the case of endoscopic surgeries, which will be described later with reference to FIG. 20, tagging needs to be done by surgeons or other experts experienced in the endoscopic surgeries, and thus tagging numerous images is not an easy task.

One possible method for reducing a burden in creating tagged images is to track a tag created in a given frame and tag an object in a new frame based on the tracking result. Conventional image tracking is performed in a forward direction. The forward direction means forward in time in a video. Tracking in the forward direction alone results in accumulation of tracking errors.

Figure 21:
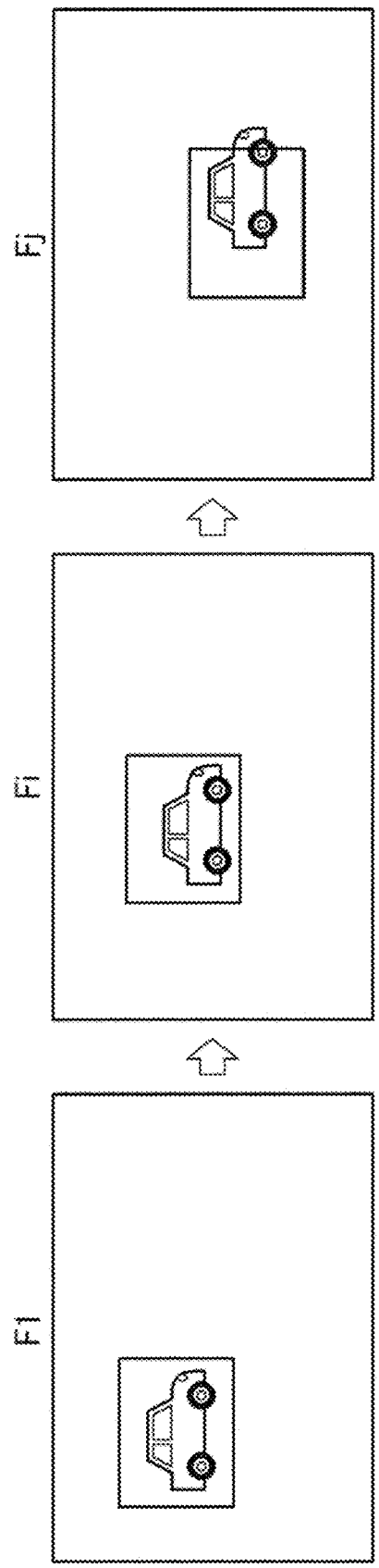
FIG. 21 explains accumulation of tracking errors.

FIG. 21 explains accumulation of tracking errors. An image F1 represents a frame image of a start frame, an image Fi represents a frame image of a frame subsequent to the start frame, and an image Fj represents a frame image subsequent to the frame image Fi. Here, the tracking target is an automobile. A frame region in the frame image F1 is a tag appended in the start frame, and frame regions in the frame images Fi, Fj are tags acquired by a tracking process. As shown in FIG. 21, tracking errors accumulate along with the repeated forward tracking, so that a frame further from the start frame has a lower tracking accuracy.

A tracking device 200 in accordance with an exemplary embodiment performs both forward tracking and backward tracking and thereby reduces accumulation of tracking errors that would otherwise result from tracking across the frames. In the case of setting a start frame and an end frame that is a frame subsequent in time to the start frame, the forward tracking is tracking in a direction from the start frame to the end frame. The backward tracking is tracking in a direction from the end frame to the start frame. This technique ensures accurate tracking. Hence, this technique enables, for example, generation of highly accurate training data, and can eventually improve accuracy of machine learning.

Japanese Unexamined Patent Application Publication No. 2005-160688 discloses a method of tracking coordinates of a single point that represents a specified portion. This method is unable to follow changes in a region (e.g., a change in region size), and is less suitable for appropriate tracking of the region. Assume that a region is a collection of points and each point is tracked by the method disclosed in Japanese Unexamined Patent Application Publication No. 2005-160688. In this case, addition of a moving vector based on a start point and a moving vector based on an end point is necessary for each point, which makes operations complicated. Further in this case, the method may cause disruption of a region (for example, a tracking target, which should originally be a single continuous region, may be dispersed into a plurality of regions). As such, it is difficult to apply the method disclosed in Japanese Unexamined Patent Application Publication No. 2005-160688 to region-based tracking.

In contrast, the method of the exemplary embodiment obtains, for each frame, a forward mask image as a result of the forward tracking and a backward mask image as a result of the backward tracking. This method then generates a combined mask image as a tracking result, based on the forward mask image and the backward mask image. This method simply requires tracking of a region in the forward direction and in the backward direction, without strictly associating tracking points in the forward tracking with tracking points in the backward tracking. The tracking point refers to a point used for tracking, more specifically a representative point (described later). This method thus enables highly accurate execution of region-based tracking.

Figure 22A:
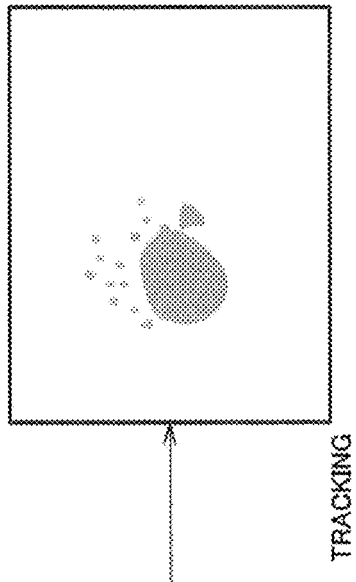
FIGS. 22A and 22B explain dispersion of a region due to tracking errors.
Figure 22B:
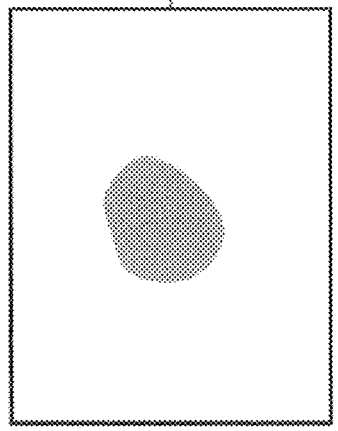

By way of example, FIGS. 22A and 22B schematically explain a conventional region-based tracking method. FIG. 22A illustrates a tagged image that is, for example, tagged manually. Hereinafter, a region corresponding to a tag in an image is referred to as a tag region. The conventional region-based tracking method performs the tracking process for each pixel. In the example shown in FIG. 22A, all pixels included in the tag region are tracked. If the tracking continues over a plurality of frames, tracking errors accumulate with an increasing number of tracking times, i.e., with the lapse of time in a video. FIG. 22B shows a result after the tracking has been performed a certain number of times. As shown in FIG. 22B, the tag region, which was a single continuous region in the original image, may be dispersed due to tracking errors.

The method of the exemplary embodiment performs region-based tracking both in forward and backward directions and then combines the tracking results. As this combining can help improve tracking accuracy, the region-based tracking may adopt a method similar to the conventional method as exemplified in FIGS. 22A and 22B. However, it is also possible to increase the accuracy of the forward tracking and the backward tracking, thereby further increasing the accuracy of the combining result.

The tracking device 200 in accordance with the exemplary embodiment may extract a contour of a tag region in each of the forward tracking and the backward tracking and may track a contour line obtained as a result of the extraction. The tracking device 200 then performs a mask process on an area inside the contour line obtained as a result of the tracking and thus determines a tag region in a new frame. This method reduces dispersion of the tag region, allowing for appropriate tracking of the tag region.

The method of the exemplary embodiment may further remove outliers to reduce the effect of tracking errors. Additionally, the method of the exemplary embodiment may re-extract representative points to be used for tracking when predetermined conditions are satisfied, such as when the number of tracked points has reduced by removal of outliers. These techniques can further increase the accuracy of both the forward tracking and the backward tracking. Below a detailed description will be given of the method of the exemplary embodiment.

2. Tracking Device

2.1 Forward Tracking and Backward Tracking

FIG. 1 illustrates a configuration example of the tracking device 200 according to the exemplary embodiment. As shown in FIG. 1, the tracking device 200 includes a frame setting section 210, a forward tracking section 220, a backward tracking section 230, a tracking result combining section 240, and a display processing section 250. It should be noted that the configuration of the tracking device 200 is not limited to that shown in FIG. 1 and may be modified in various ways, such as by removing one or some of these components and adding other components.

The tracking device 200 of the exemplary embodiment is configured with the following hardware. The hardware may include at least one of a digital signal processing circuit and an analog signal processing circuit. For example, the hardware may be composed of one or more circuit devices mounted on a circuit board or may be composed of one or more circuit elements. The one or more circuit devices include an integrated circuit (IC) or a field-programmable gate array (FPGA), for example. The one or more circuit elements include a resistor or a capacitor, for example.

Alternatively, the sections of the tracking device 200 including the frame setting section 210, the forward tracking section 220, the backward tracking section 230, and the tracking result combining section 240 may be implemented by the following processor. The tracking device 200 includes a memory storing information and a processor configured to operate based on the information stored in the memory. The information includes programs and various data, for example. The processor includes hardware. The processor may be any of various processors including a central processing unit (CPU), a graphics processing unit (GPU) and a digital signal processor (DSP). The memory may be a semiconductor memory such as a static random-access memory (SRAM) or a dynamic random-access memory (DRAM), or may be a register. The memory may also be a magnetic storage device such as a hard disk device or an optical storage device such as an optical disk device. For example, the memory stores computer-readable instructions, and functions of the respective sections in the tracking device 200 are implemented as processes by the processor executing the instructions. These instructions may be an instruction set included in a program or may be instructions that cause operations of the hardware circuit included in the processor. Still alternatively, all or some of the frame setting section 210, the forward tracking section 220, the backward tracking section 230, and the tracking result combining section 240 may be implemented in a cloud computing environment, so that a video is obtained via a network and subjected to a tracking process (described later) on cloud computing.

The frame setting section 210 obtains a video and sets a start frame and an end frame. The video as referred to here is, for example, a tagged moving image that includes some tagged frames. For example, the frame setting section 210 sets a start frame and an end frame from among the tagged frames in the video.

The forward tracking section 220 generates a forward mask image of a tracking target by tracking a region of the tracking target in the forward direction in frames subsequent to the start frame, based on a region of the tracking target in the start frame. The region of the tracking target in the start frame can be obtained from the tagged region.

The backward tracking section 230 generates a backward mask image of the tracking target by tracking a region of the tracking target in the backward direction in frames previous to the end frame, based on a region of the tracking target in the end frame. The region of the tracking target in the end frame can be obtained from the tagged region.

The tracking result combining section 240 combines the forward mask image and the backward mask image for each of the frames where the forward tracking and the backward tracking have been performed, and thus generates a combined mask image indicating a region of the tracking target.

The display processing section 250 outputs an image based on the combined mask image so as to cause a display section to display the image. The display section as referred to here is, for example, a display section 54, which will be described later with reference to FIG. 17. The display processing section 250 processes a given frame image based on a combined mask image corresponding to that frame, and outputs the processing result so as to cause the display section to display the image.

Figure 2:
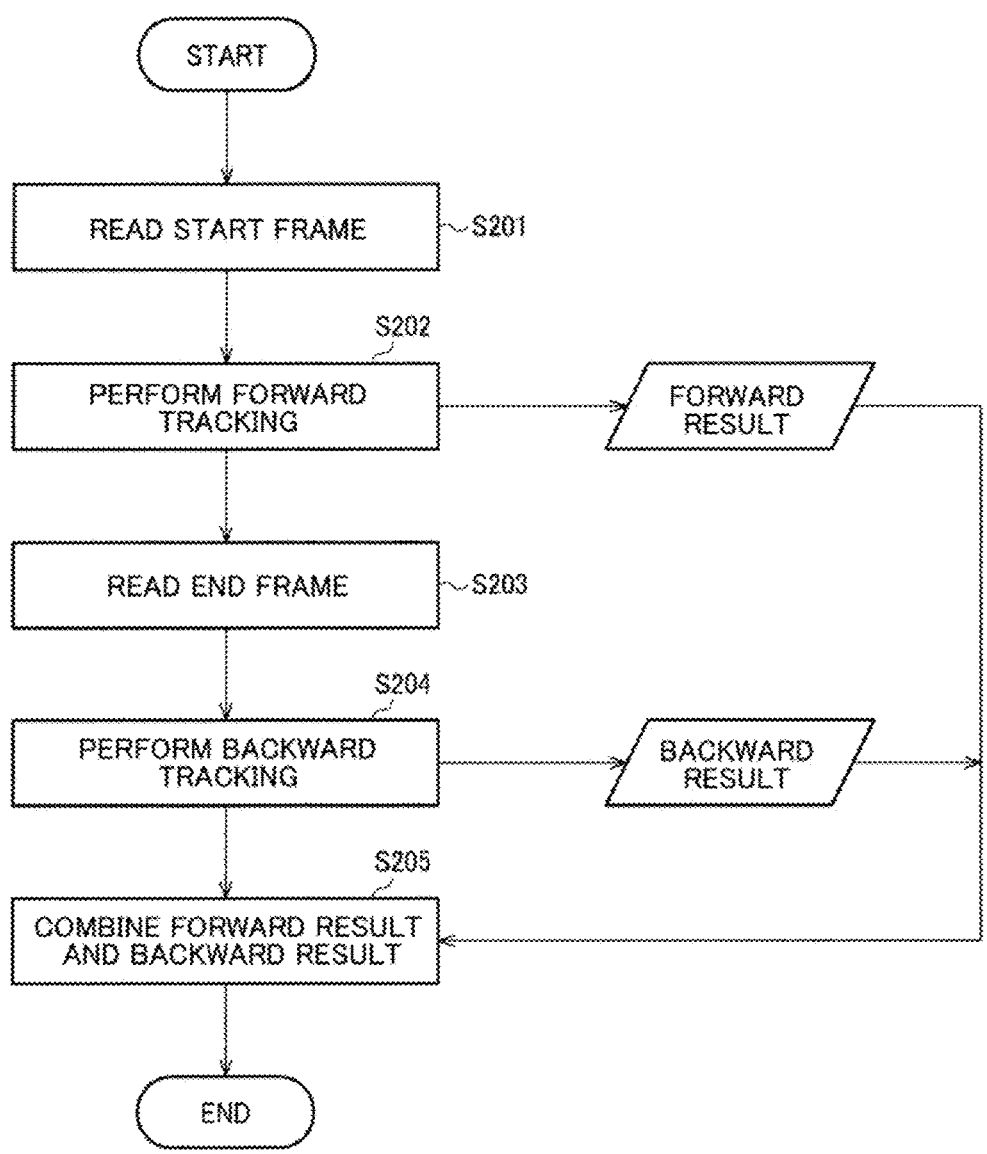
FIG. 2 is a flowchart showing a processing procedure by the tracking device.

FIG. 2 is a flowchart of a process in accordance with the exemplary embodiment. As preprocessing for this process, the frame setting section 210 sets the start and end frames. The frames from the start frame to the end frame are subjected to the tracking process.

At step S201, the forward tracking section 220 reads information about the start frame set by the frame setting section 210. At step S202, the forward tracking section 220 performs the forward tracking based on the start frame. The forward tracking section 220 sets a plurality of representative points based on the tag region in the start frame and tracks each of the representative points in the forward direction until the end frame. Details of the forward tracking will be given later with reference to FIGS. 5-11. The processing at step S202 produces a forward result. The forward result refers to information identifying a tag region in each frame, from a frame next to the start frame to the end frame, and more specifically refers to a mask image in each of these frames. The mask image as the forward result is referred to as a forward mask image.

At step S203, the backward tracking section 230 reads information about the end frame set by the frame setting section 210. At step S204, the backward tracking section 230 performs the backward tracking based on the end frame. The backward tracking section 230 sets a plurality of representative points based on the tag region in the end frame and tracks each of the representative points in the backward direction until the start frame. Details of the backward tracking will be given later with reference to FIGS. 5-11. The processing at step S204 produces a backward result. The backward result refers to information identifying a tag region in each frame, from a frame immediately before the end frame to the start frame, and more specifically refers to a mask image in each of these frames. The mask image as the backward result is referred to as a backward mask image.

At step S205, the tracking result combining section 240 generates a combined mask image by combining the forward mask image and the backward mask image.

FIG. 3 illustrates frame images from the start frame to the end frame and the relationship of the forward mask image, the backward mask image, and the combined mask image in each frame. While FIG. 3 depicts a person's face as the tracking target, the specific tracking target may be a subject whose position and orientation in an image is unclear, as will be described later with reference to FIGS. 12A-12C. For example, the forward mask image is image data in which the tag region is assigned a value of 1 while the other region is assigned a value of 0. In FIG. 3, each tag region is shown by hatching.

In the forward tracking, the tag region in the start frame is information that is, for example, manually appended by an operator, and thus this tag region can be considered to match a region of the tracking target. Repeating the forward tracking results in accumulation of tracking errors. As shown in FIG. 3, while the actual tracking target changes its position and shape across the frame images, the tag region cannot perfectly follow these changes and thus errors between the tracking target and the tag region become larger in frames further from the start frame.

In the backward tracking, the tag region in the end frame is information that is, for example, manually appended by an operator, and thus this tag region can be considered to match a region of the tracking target. Repeating the backward tracking results in accumulation of tracking errors, and thus errors between the tracking target and the tag region become larger in frames further from the end frame.

The tracking result combining section 240 obtains a combined mask image based on characteristics that the forward mask image is more accurate when it is closer to the start frame and that the backward mask image is more accurate when it is closer to the end frame. Specifically, the tracking result combining section 240 combines the forward mask image and the backward mask image such that the forward mask image is given a greater weight than the backward mask image in a frame closer to the start frame while the backward mask image is given a greater weight than the forward mask image in a frame closer to the end frame.

As shown in FIG. 3, the forward mask image has a higher contribution to the combined mask image in a frame closer to the start frame. On the other hand, the backward mask image has a higher contribution to the combined mask image in a frame closer to the end frame. As such, a greater weight is given to a mask image having a relatively higher accuracy than the others, which enables a higher accuracy of the combined mask image, namely enables setting of a tag region with a high degree of match with the tracking target.

By way of example, when a forward weight that is a weight on the forward mask image is wf and a backward weight that is a weight on the backward mask image is wb, the combined mask image can be obtained by the following expression (1). In the following expression (1), I represents the combined mask image, If represents the forward mask image, and Ib represents the backward mask image. Also, t represents a lapse of time in the video starting from the start frame, or a frame position or a frame number in the image. As each of the images I, If, and Ib includes a plurality of pixels, the calculation of the following expression (1) is performed for each pixel.

$$I(t) = wf(t) \times If(t) + wb(t) \times Ib(t) \tag{1}$$

As described above, wf>wb when t is closer to the start frame, and wf<wb when t is closer to the end frame. Specific values of wf and wb may be modified in various ways so long as wf and wb satisfy the above relationship.

Figure 4A:
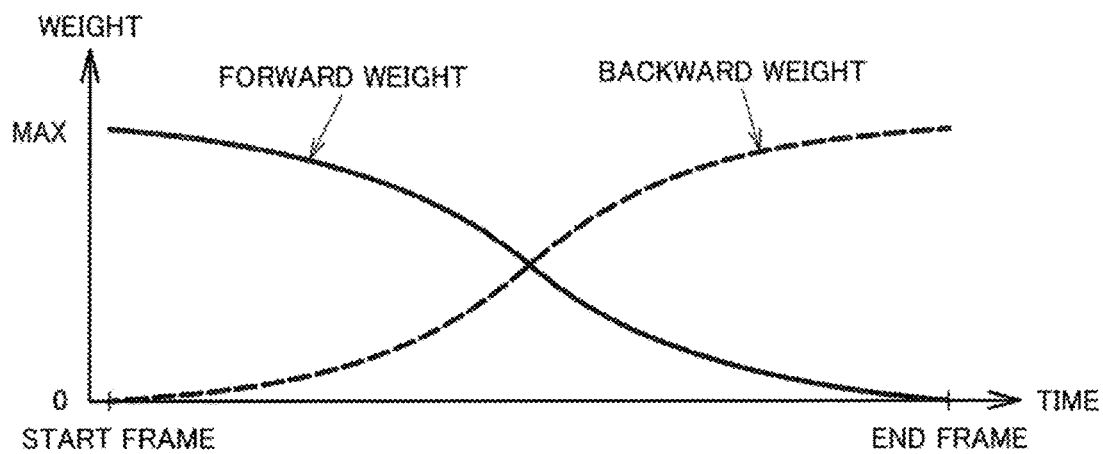
FIGS. 4A-4C illustrate examples of weighting coefficients as weight information.
Figure 4B:
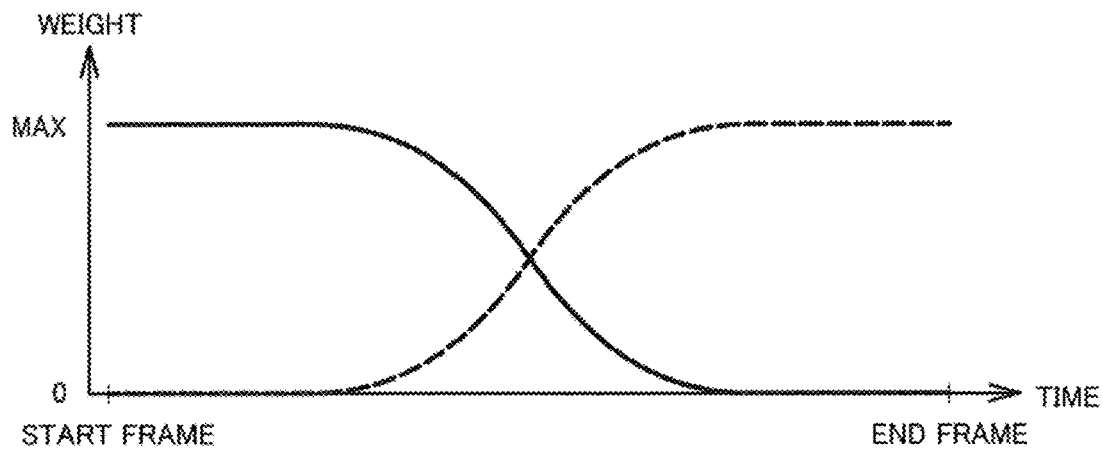
Figure 4C:
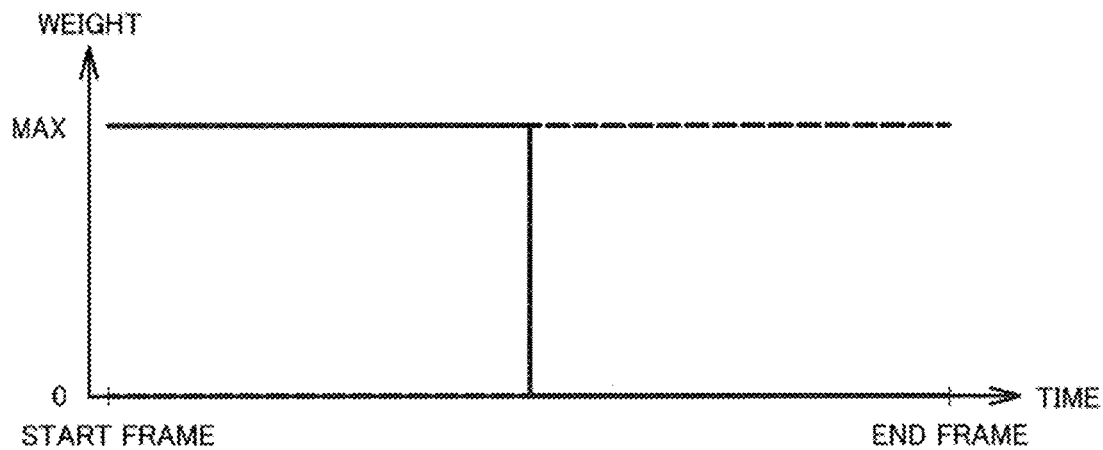

FIGS. 4A-4C illustrate examples of the weights wf and wb. The horizontal axis in FIGS. 4A-4C corresponds to t described above (e.g., time). The vertical axis in FIGS. 4A-4C represents the magnitude of the weights.

As shown in FIG. 4A, the weight wf is a function that decreases monotonically from the start frame to the end frame, and the weight wb is a function that increases monotonically from the start frame to the end frame. In this case, the tracking result combining section 240 blends the forward mask image and the backward mask image to generate the combined mask image, in frames other than the start frame and the end frame.

Alternatively, as shown in FIG. 4B, the weight wf may be 1 and the weight wb may be 0, within a predetermined number of frames after the start frame. Also, the weight wf may be 0 and the weight wb may be 1, within a predetermined number of frames before the end frame. In this case, the tracking result combining section 240 applies the forward mask image directly as the combined mask image within the predetermined number of frames after the start frame, and applies the backward mask image directly as the combined mask image within the predetermined number of frames before the end frame. In each intermediate frame, the tracking result combining section 240 generates the combined mask image by blending the forward mask image and the backward mask image. The combining of the forward and backward mask images in the exemplary embodiment includes a case where one of the forward mask image and the backward mask image is given a weight of 0. In this case, the backward tracking may be disabled within the predetermined number of frames after the start frame, and the forward tracking may be disabled within the predetermined number of frames before the end frame.

Still alternatively, as shown in FIG. 4C, the weight wf may be 1 and the weight wb may be 0, from the start frame to a given frame. Then, the weight wf may be 0 and the weight wb may be 1, from a frame next to the given frame to the end frame. In this case, the tracking result combining section 240 applies either one of the forward mask image or the backward mask image, as the combined mask image in all frames. The combining of the forward and backward mask images in the exemplary embodiment includes a case of weighting as shown in FIG. 4C. In this case, the backward tracking may be disabled from the start frame to the given frame, and the forward tracking may be disabled from the frame next to the given frame to the end frame.

The tracking result combining section 240 may obtain the combined mask image using the following expression (2). In the following expression (2), x is a two-dimensional vector representing a position of a pixel in an image. As shown in the following expression (2), each of the weights wf and wb is a function of the position x as well as the time t. In other words, the tracking result combining section 240 may combine the forward mask image and the forward mask image by giving a weight to the position x in an image.

$$I(t,x) = wf(t,x) \times If(t,x) + wb(t,x) \times Ib(t,x) \tag{2}$$

For example, the tracking result combining section 240 obtains a reference position of the tag region in the forward mask image and changes the weight based on a distance from the reference position. A non-limiting example of the reference position is a gravity center of the tag region. The forward tracking and the backward tracking in the method of the exemplary embodiment is region-based tracking. For example, the tracking is performed using representative points on a contour, as will be described later. For this reason, tracking errors are relatively likely to occur on and near a boundary of the tag region. On the other hand, even if tracking errors occur on or near the boundary, a center portion of the tag region is likely to follow the tracking target with sufficiently high accuracy. In view of this, the tracking result combining section 240 sets a greater weight wf at a position closer to the reference position, and sets a smaller weight wf at a position further from the reference position. In this case, tracking results that deviate from a predetermined range can be excluded from a combining process by the tracking result combining section 240. While the above description has been given of the weight wf, the same applies to the backward weight wb; the tracking result combining section 240 obtains a reference position of the tag region in the backward mask image and sets the weight wb based on a distance from the reference position.

The exemplary embodiment does not preclude directly outputting the generated combined mask image. For example, machine learning is performed based on data set in which each frame image included in a video is associated with a combined mask image. It should be noted that when the above expression (1) or (2) is used, the combined mask image may be a multi-valued image, not a binary image. For example, even when each of the forward mask image and the backward mask image is a binary image with values 0 and 1, the combined mask image is a multi-valued image whose pixel values change in a range from 0 to 1. In this case, machine learning may take the multi-valued combined mask image as a true label. For example, in the case where a well-known softmax layer is applied as an output layer of a neural network, the output therefrom is probability data. In the case of a neural network for recognition of a given subject, its output layer outputs, for each pixel, probability data representing a probability of each pixel capturing the given subject and probability data representing a probability of each pixel capturing a different subject other than the given subject. The aforementioned multi-valued combined mask image can be considered as data corresponding to probability data, and thus the combined mask image can be used as training data for learning.

However, the tracking device 200 may output a result of any processing on the combined mask image generated by the tracking result combining section 240. For example, the display processing section 250 may perform a display process based on the combined mask image. The display process is, for example, a process of presenting a tag region generated from tracking to a user and allowing the user to make fine adjustments to the tag region.

For example, the display processing section 250 performs a process of superimposing, on a frame image in a video, a mask image corresponding to the frame. For example, the display processing section 250 displays an original unprocessed frame image for regions other than the tag region, and displays a processed frame image as a result of processing on the original frame image for a region corresponding to the tag region. The processing as referred to here may be a process of changing pixel values into predetermined ones or may be a process of changing pixel values in a frame image by a predetermined amount. The pixel values herein may be at least one of RGB signal values or may be luminance signals or color difference signals.

The display processing section 250 may also superimpose a tracking result on a video such that a non-overlapping portion where the forward mask image and the backward mask image do not overlap each other has a higher transparency than an overlapping portion where the forward mask image and the backward mask image overlap each other. The tracking result as referred to here is more specifically the combined mask image. In this case, a highly reliable region is relatively opaque (less transparent), having a large change from the original image. The resulting image clearly indicates to users that this region is the tag region. On the other hand, a less reliable region, where the two mask images do not overlap each other, retains features of the original frame image. The resulting image attracts relatively less attention of users. Further, this technique makes the original frame image easily visible, and can thus facilitate user's determination as to the adequacy of the tag region and user's fine adjustments to the tag region.

As described above, the tracking device 200 of the exemplary embodiment includes the frame setting section 210, the forward tracking section 220, the backward tracking section 230, and the tracking result combining section 240. The frame setting section 210 sets the start and end frames for a video including a plurality of frames. The forward tracking section 220 performs the forward tracking of tracking a tracking target in the forward direction in frames subsequent to the start frame, based on a region of the tracking target in the start frame. The backward tracking section 230 performs the backward tracking of tracking the tracking target in the backward direction in frames previous to the end frame, based on a region of the tracking target in the end frame. For each of the frames where the forward tracking and the backward tracking have been performed, the tracking result combining section 240 combines the forward mask image based on the forward tracking and the backward mask image based on the backward tracking, and thus generates the combined mask image indicative of a region of the tracking target. Note that the forward mask image may be obtained by the forward tracking section 220. In an alternative configuration, the forward tracking section 220 may obtain information about representative points or information about a contour (closed curve), and the forward mask image may be obtained by the tracking result combining section 240. The same applies to the backward mask image.

The method of the exemplary embodiment can reduce accumulation of tracking errors in temporally subsequent frames by performing the backward tracking starting from the end frame in addition to the forward tracking. This enables highly accurate tracking between the start and end frames. The method of the exemplary embodiment further generates the combined mask image by combining the forward mask image and the backward mask image. This means that the method tracks a specified portion as a region. Hence, even when the size of the specified portion changes over time, the method can track any change in size of the region. The combining of the mask images can further prevent disruption of the region. The method of the exemplary embodiment simply requires tracking of a region in the forward direction and in the backward direction, without depending on specific tracking points. Hence, the method eliminates the need for associating tracking points in the forward tracking with tracking points in the backward tracking, allowing for easy implementation of tracking in both directions. Additionally, the method does not require the forward tracking to maintain tracking points set in the start frame through to the end frame. For example, as will be described later with reference to FIGS. 9 and 10, the method can exclude outlier representative points from the processing or re-extract representative points, providing high flexibility in the processing. Such removal of outliers and update of representative points also help improve accuracy of the forward tracking. The same applies to the backward tracking.

The region of the tracking target in the start frame and the region of the tracking target in the end frame may be set based on tagging data appended to the tracking target. For example, the method of the exemplary embodiment tags intermediate frames between a manually tagged start frame and a manually tagged end frame so as to produce smooth transitions from the start frame to the end frame.

This method enables appropriate tracking of the tag region. The tagged region may be a subject that is not clearly captured in an image, as will be described later with reference to FIGS. 12A-12C. While tagging to such a subject is not easy for anyone but experts, the tracking allows for efficient tagging.

The tracking device 200 may further include the display processing section 250 that superimposes the combined mask image on a video such that a non-overlapping portion where the forward mask image and the backward mask image do not overlap each other in the combined mask image has a higher transparency than an overlapping portion where the forward mask image and the backward mask image overlap each other in the combined mask image. This technique can express differences in the overlapping state of the forward mask image and the backward mask image by the degree of transparency in the combined mask image, allowing a user to recognize highly reliable portions and less reliable portions in the combined mask image. By presenting the low-reliability portions of the frame image in an easily visible manner, this technique can also prompt a user to check the tag region and make fine adjustments thereto.

The tracking result combining section 240 sets weight information such that the forward mask image is weighted more greatly than the backward mask image in frames closer to the start frame, and sets weight information such that the backward mask image is weighted more greatly than the forward mask image in frames closer to the end frame. The tracking result combining section 240 generates the combined mask image by combining the forward mask image and the backward mask image based on the weight information. This technique allows the mask image with higher tracking accuracy to have a larger contribution in a combining process, and thus can increase tracking accuracy of the resultant combined mask image.

The tracking result combining section 240 may apply the forward mask image as the combined mask image within a predetermined number of frames after the start frame, and may apply the backward mask image as the combined mask image within a predetermined number of frames before the end frame. For example, the tracking result combining section 240 performs a combining process using the weights shown in FIG. 4B. This technique allows the mask image with higher tracking accuracy to have a larger contribution in the combining process. This technique can also reduce a processing load by eliminating the process of blending the two mask images within the predetermined number of frames. Note that the predetermined number of frames after the start frame may be equal to or different from the predetermined number of frames before the end frame.

The tracking result combining section 240 may combine the forward mask image and the backward mask image based on weighting coefficients that are dependent on a frame position in a video and a pixel position in an image. A combining process in consideration of a position in an image can reduce incorporation of an inappropriate tracking result into the combined mask image.

Specifically, the tracking result combining section 240 may generate the combined mask image using the forward weighting coefficient wf and the backward weighting coefficient wb and based on the above expression (2), where x is a pixel position, t is a frame position, I is the combined mask image, If is the forward mask image, and Ib is the backward mask image. In the preceding description of the above expression (2), t is a parameter representing time. However, since the frame rate is known as a matter of design, those skilled in the art will readily understand that conversion between time and frame number is simple and that t may be replaced with a frame position (a frame number).

The processing by the tracking device 200 of the exemplary embodiment may be implemented as a tracking method. The tracking method includes steps of: setting a start frame and an end frame in a video including a plurality of frames; performing forward tracking of tracking a tracking target in a forward direction in frames subsequent to the start frame, based on a region of the tracking target in the start frame; performing backward tracking of tracking the tracking target in a backward direction in frames previous to the end frame, based on a region of the tracking target in the end frame; and generating, for each of the frames where the forward tracking and the backward tracking have been performed, a combined mask image indicative of a region of the tracking target by combining a forward mask image based on the forward tracking and a backward mask image based on the backward tracking.

2.2 Contour Tracking

Figure 5:
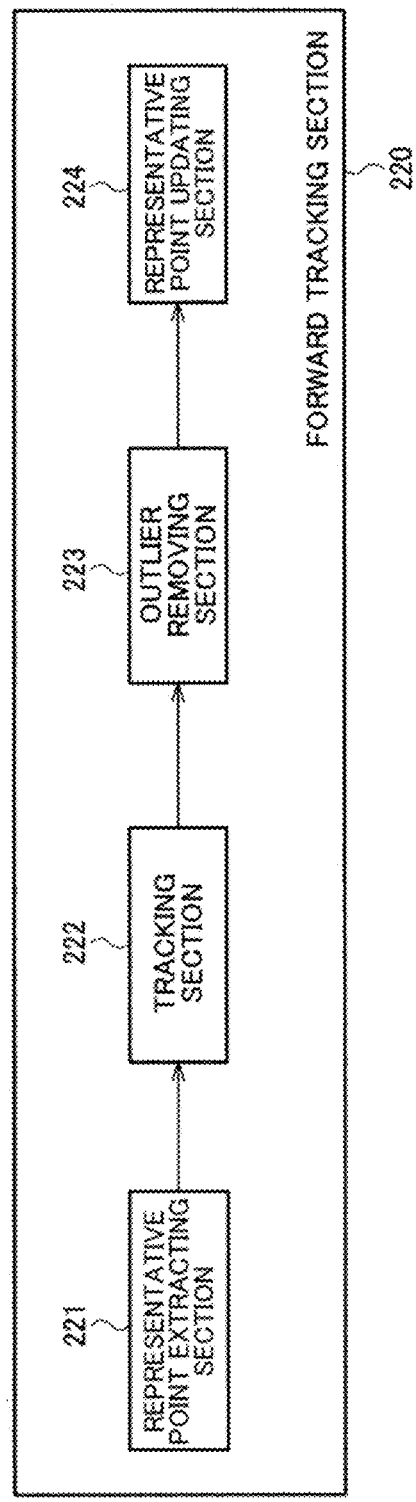
FIG. 5 illustrates a configuration example of a forward tracking section.

FIG. 5 illustrates a configuration example of the forward tracking section 220 of the exemplary embodiment. As shown in FIG. 5, the forward tracking section 220 includes a representative point extracting section 221, a tracking section 222, an outlier removing section 223, and a representative point updating section 224.

The representative point extracting section 221 extracts representative points for tracking from a contour of a tracking target in the start frame. The contour of the tracking target in the start frame can be obtained from a tagged region in the start frame.

The tracking section 222 tracks the representative points extracted by the representative point extracting section 221 across frames subsequent to the start frame. When the representative points have been updated by the representative point updating section 224, the tracking section 222 tracks the updated representative points, as will be described later.

The outlier removing section 223 determines an outlier based on the mutual relationship of the representative points tracked by the tracking section 222 and removes an outlier representative point that has been determined as an outlier.

The representative point updating section 224 determines whether to update the representative points or not. Upon determination that updating the representative points is necessary, the representative point updating section 224 newly extracts representative points in a frame under processing, based on the state of the representative points after removal of any outlier representative point.

Figure 6:
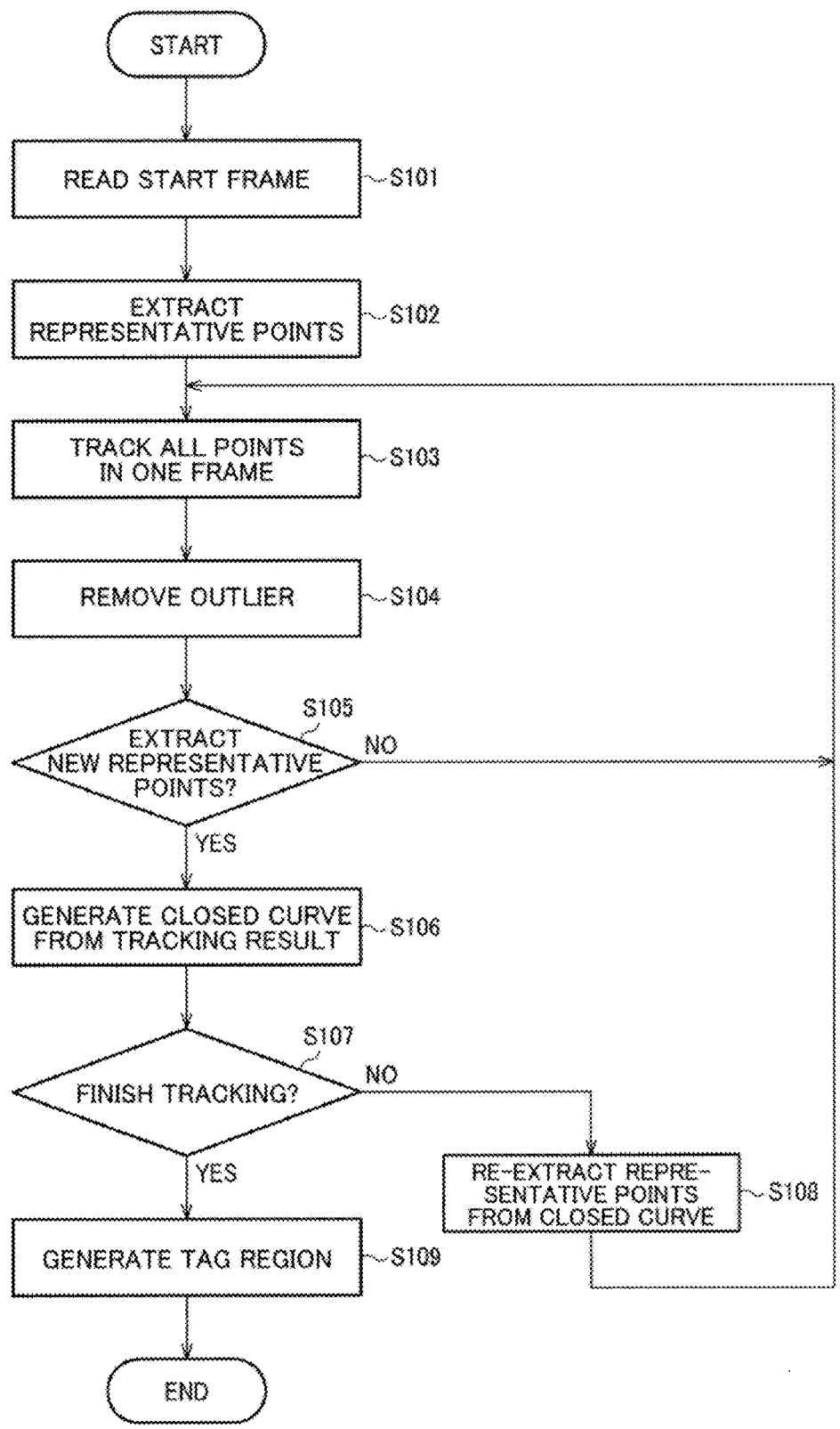
FIG. 6 is a flowchart showing a processing procedure for tracking.
Figure 7:
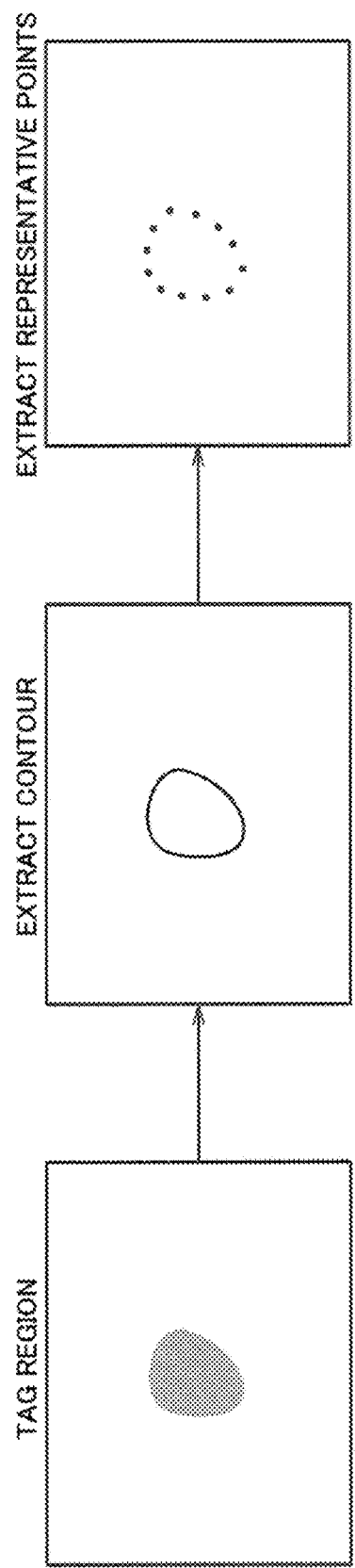
FIG. 7 explains a process of extracting representative points based on a tag region.

FIG. 6 is a flowchart showing a procedure of the forward tracking. At the start of this processing, at step S101, the representative point extracting section 221 reads information about the start frame set by the frame setting section 210. At step S102, the representative point extracting section 221 extracts representative points (i.e., points to be tracked) from a contour of a tracking target included in the start frame. FIG. 7 explains a process of extracting representative points. The tag in the exemplary embodiment is annotation data that is information input by operators such as surgeons and appended as metadata to images, as will be described later with reference to FIGS. 14 and 15 by way of example. The annotation data is, for example, a mask image in which a pixel value in a tag region is set to a first value and a pixel value other than in the tag region is set to a second value different from the first value.

The representative point extracting section 221 extracts a contour of the tag region. In the case where the information about the tag region is acquired as a mask image as described above, for example, the representative point extracting section 221 extracts, as a contour of the tag region, pixels that have the first pixel value and that are adjacent to pixels having the second pixel value. However, the contour extraction process may be modified in various ways, such as by applying a known edge extraction filter.

The representative point extracting section 221 may select all pixels on the contour as representative points to be tracked. Even in this case, there is no need to track pixels inside the tag region, which prevents dispersion of the region and also reduces a processing load. The representative point extracting section 221 may, however, extract some of the pixels on the contour as representative points. For example, the representative point extracting section 221 extracts representative points at equal intervals from among the pixels on the contour. For example, as shown in FIG. 7, the representative point extracting section 221 extracts twelve representative points such that adjacent representative points are equally (including substantially equally) spaced. The representative point extracting section 221 may preset the number n of representative points to be extracted (where n is an integer not less than two) and set the n representative points by dividing the contour line into n parts. Alternatively, an interval between each adjacent two representative points may be preset, and the representative point extracting section 221 may set the representative points according to the interval. In this case, the number of representative points depends on the length of the contour line.

As will be described later with reference to FIG. 11, the tracking device 200 of the exemplary embodiment generates a closed curve connecting the representative points as the tracking result and defines a region inside the closed curve as the tag region. Hence, representative points used for tracking should be able to reproduce the contour of the tracking target with a reasonably high accuracy when connected to each other. In the case of a simple contour shape, information about the contour is less likely to be lost even with a small number of representative points. On the other hand, in the case of a complicated contour shape, information about the contour may be lost unless many representative points are set.

The representative point extracting section 221 may set representative points based on the curvature of the contour. For example, the representative point extracting section 221 divides the extracted contour into a plurality of curves and obtains the curvature of each divided curve. For example, in the case where a curve is approximated by a circle, the radius of this circle is the radius of curvature, and its inverse is the curvature. The curvature of the contour may be obtained for each pixel. The representative point extracting section 221 extracts more representative points from a portion of the contour with a high curvature than from a portion thereof with a low curvature. This technique enables adjustment to the density of the representative points according to the shape of the contour, and hence enables appropriate reproduction of the contour based on the representative points. In other words, this technique enables highly accurate tracking of the region of the tracking target.

After the extraction of the representative points in the start frame, the tracking section 222 tracks the extracted representative points at step S103. Specifically, the tracking section 222 estimates where a given representative point in a first frame will be present in an image of a second frame next to the first frame.

Figure 8:
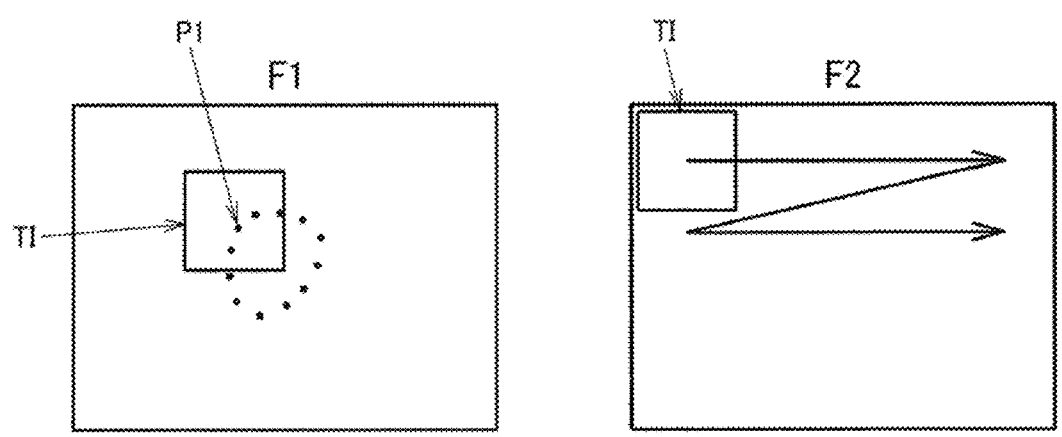
FIG. 8 explains a tracking process.

FIG. 8 explains a tracking process. Tracking is performed using frame images of two frames. From a frame image F1 of the first frame, the tracking section 222 extracts a region around a given representative point P1 as a template image TI. The template image TI is, for example, a rectangular image of a predetermined size centered on the representative point P1, though the size and shape of the template image TI may be modified in various ways. The tracking section 222 performs template matching using the template image TI in a frame image F2 of the second frame, as shown in FIG. 8. The tracking section 222 determines a position with the smallest difference from the template image TI or a position with the highest match with the template image TI as a point corresponding to the representative point P1. A search area in the template matching may be a whole or part of the frame image F2. The tracking section 222 performs the process shown in FIG. 8 for each of the representative points in the first frame to thereby track the representative points. The tracking may be modified in various ways; applicable tracking methods may include a method based on luminance or contrast of frame images at the representative points, a method based on optical flow, and the like.

At step S104, the outlier removing section 223 removes outliers from the tracked points. The representative points in the exemplary embodiment represent the contour of the tracking target. It is unlikely that the shape of the tracking target in an image changes greatly from one frame to the next. A great change in an imaging target occurs, for example, when a scene has changed as will be described later with reference to FIG. 16, in which case there is less need to continue the tracking. Thus, in situations where tracking is performed, it can be said that movements of a plurality of representative points show somewhat similar tendencies. If a given representative point shows a distinctively different movement from other representative points, it is highly probable that the given representative point is mistakenly tracked.

Based on the mutual relationship of the representative points, the outlier removing section 223 extracts any representative point that has moved differently from other representative points as an outlier representative point. For example, the outlier removing section 223 determines a given representative point to be an outlier representative point if a difference between a moving distance of the given representative point and a moving distance of nearby representative points exceeds a predetermined value. Alternatively, the outlier removing section 223 determines a given representative point to be an outlier representative point if a distance between the given representative point and nearby representative points exceeds a predetermined value.

Still alternatively, the outlier removing section 223 determines a given representative point to be an outlier representative point if a curvature of a curve formed by connecting the given representative point and nearby representative points exceeds a predetermined value. The nearby representative points in this context refer to two representative points adjacent to the given representative point in a direction along the contour line, namely adjacent representative points on both sides of the given representative point. However, the nearby representative points may be modified in various ways, such as by adding one or more points in addition to the two adjacent points. Determining a degree of deviation of the representative points in this manner enables appropriate removal of any outlier representative point.

Figure 9:
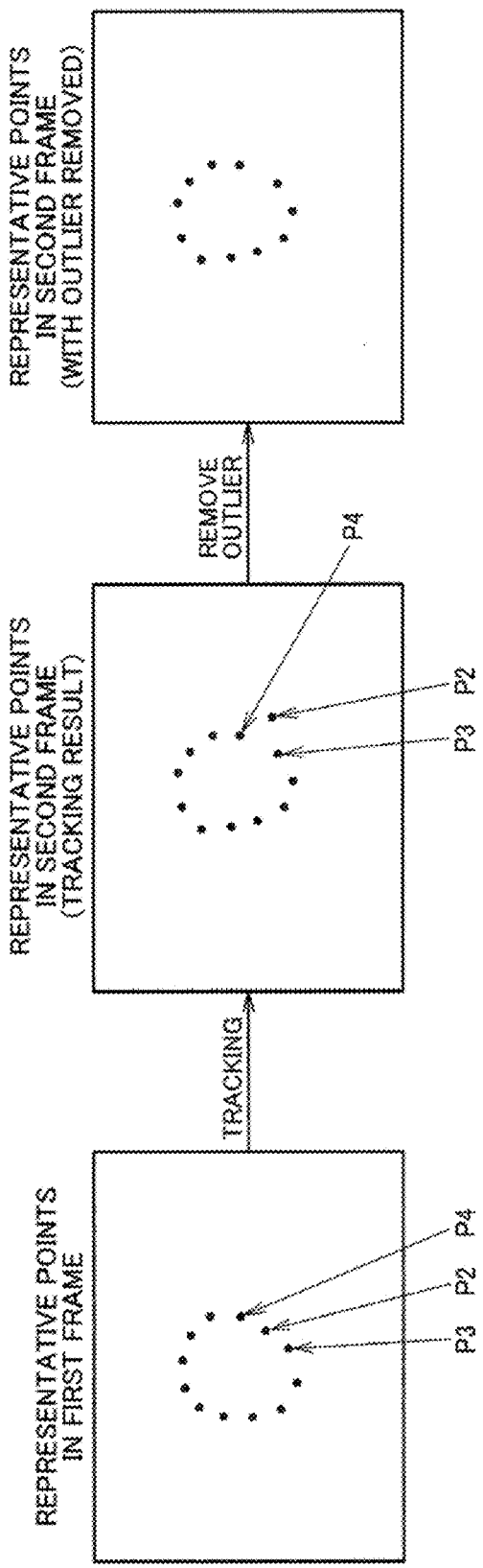
FIG. 9 explains a process of removing an outlier representative point.

FIG. 9 explains an outlier removing process. A representative point P2 in FIG. 9 has a larger moving distance than its adjacent representative points P3 and P4. From another standpoint, a curve passing through the points P2-P4 has a high curvature. Note that the curvature may be compared with a given fixed value, a curvature in the first frame, or a curvature related to other representative points in the second frame. In any of these comparisons, the curvature corresponding to the representative point P2 is determined to be high. Thus, the outlier removing section 223 removes the representative point P2.

Through the processing at steps S103 and S104, highly accurate representative points with inappropriate ones removed are obtained in the second frame subsequent to the first frame on which the tracking is based. The tracking process shown in FIG. 8 is performed on each of the plurality of representative points after the outlier removal in the second frame, so that the tracking may continue in the third frame and onwards following the second frame.

However, to ensure accurate tracking in the present embodiment, the representative point updating section 224 determines, at step S105, whether the representative points need to be updated. As described above, the method of the exemplary embodiment removes any representative point determined as an outlier representative point, and thus may reduce the number of representative points. An excessive reduction in the number of representative points causes difficulty in reproducing the contour of the tracking target with residual representative points, and results in inaccurate tracking. Hence, if the number of representative points falls below a predetermined number, the representative point updating section 224 determines that the representative points need to be updated.

Figure 10:
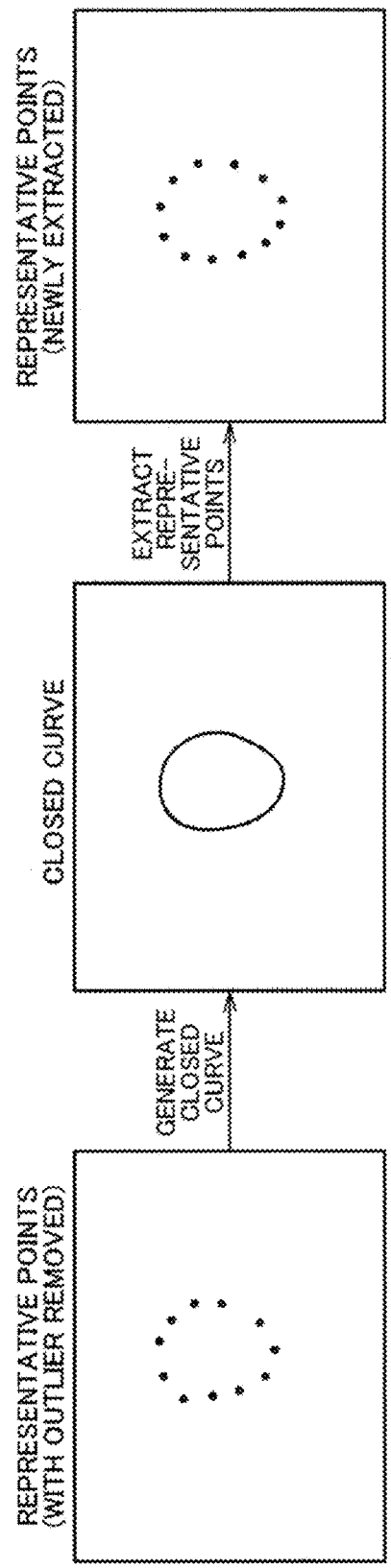
FIG. 10 explains a process of updating representative points.

FIG. 10 explains a process of updating the representative points. At step S106, the representative point updating section 224 first generates a closed curve by connecting all representative points remaining after removal of outliers. For example, the representative point updating section 224 generates a closed curve by applying a known spline interpolation method. However, there are various known methods for generating a closed curve from a plurality of points, and these are generally applicable to the exemplary embodiment.

At step S108, the representative point updating section 224 re-extracts representative points from the generated closed curve. Since this update of the representative points is to ensure continuation of accurate tracking, it is first determined whether to finish the tracking or not at step S107 in the flowchart in FIG. 6. If the tracking is not to be finished, then the representative point updating section 224 re-extracts representative points.

A process of re-extracting representative points is similar to the process of extracting representative points from the contour in the start frame.

That is, the representative point updating section 224 may extract representative points at equal intervals from among the pixels on the closed curve or may change the density of representative points according to the curvature of the closed curve. In so doing, newly extracted representative points do not need to coincide with original ones. For example, as shown in FIG. 10 where a closed curve is generated from eleven representative points and then twelve representative points are re-extracted, it is not required to keep the original eleven representative points when adding a representative point, and all twelve representative points can be newly selected. This is because the method of the exemplary embodiment is intended to track a contour of a tracking target and is thus not dependent on the positions of the representative points on the contour.

The representative point updating section 224 may also determine that the representative points need to be updated if reliability of the tracking result falls below a predetermined value. The reliability of the tracking result refers to a minimum value of a degree of mismatch in the template matching or a maximum value of a degree of match in the template matching, for example. The degree of mismatch is measured by the sum of squared difference (SSD) or the sum of absolute difference (SAD), for example, and the reliability is determined to be low if the minimum value is at or above a predetermined threshold. The degree of match is measured by the normalized cross correlation (NCC), for example, and the reliability is determined to be low if the maximum value is at or below a predetermined threshold. Updating the representative points can change a template image for the template matching. Thus, updating the representative points helps improve tracking accuracy.

From the standpoint of refreshing the representative points once tracking accuracy has decreased, the representative point updating section 224 may also determine that the representative points need to be updated if the tracking has been performed a predetermined number of frames, namely if a predetermined time period has elapsed. Continuing the tracking over a plurality of frames results in accumulation of tracking errors. By determining whether a predetermined time period has elapsed or not, it is possible to update the representative points when the tracking accuracy may have decreased.

If the representative points do not need updating (No at step S105) or after the representative points have been updated (after the process at step S108), the process returns to step S103 and continues from that step. The tracking section 222 performs tracking for one frame based on the representative points in the latest frame. The processes after this step are similar to the above; removal of outliers, (if necessary) update of the representative points, and tracking for a subsequent frames based on the results of these processes.

If it is determined that the tracking is to be finished (Yes at step S107), the tracking device 200 generates a tag region at step S109. FIG. 11 explains a process of generating a tag region. Specifically, a closed curve connecting the representative points is generated in each frame, and a region inside the closed curve is defined as a tag region. The process of generating the closed curve is similar to that at step S106. The representative points in each frame refer to those after the outlier representative point removal process. Note that in any frame in which the representative points have been updated, the closed curve as a result of the processing at step S106 may be applied again.

While the above description has been given of the forward tracking, the same applies to the backward tracking. Specifically, with the start frame in the aforementioned forward tracking process being replaced with the end frame, the backward tracking section 230 performs the tracking process shown in FIG. 8 backward in time.

As described above, the forward tracking section 220 may extract start tracking points from a contour of the tracking target in the start frame and perform the forward tracking based on the extracted start tracking points. Likewise, the backward tracking section 230 may extract end tracking points from a contour of the tracking target in the end frame and perform the backward tracking based on the extracted end tracking points. Specifically, the start tracking points refer to representative points set in the start frame, and the end tracking points refer to representative points set in the end frame.

Tracking the contour in this manner can reduce dispersion of pixels, ensuring appropriate implementation of the region-based tracking. This technique also eliminates the need for tracking pixels inside the region, and thus can increase the processing speed. Additionally, the outlier determination enables removal of any inappropriate representative point from the tracking result, which can improve tracking accuracy. Since all representative points are set on a contour, outlier representative points can be appropriately detected based on the mutual relationship of the representative points. Even when, for example, outlier representative points have been removed, updating the representative points ensures accurate tracking.

The forward mask image is an image that identifies a region inside a closed curve connecting a plurality of points as a result of tracking the start tracking points. The backward mask image is an image that identifies a region inside a closed curve connecting a plurality of points as a result of tracking the end tracking points. This ensures appropriate implementation of the region-based tracking and appropriate combining of a region-based forward tracking result and a region-based backward tracking result. As described above, representative points may be updated in the forward tracking. This means that a result of tracking the start tracking points includes a result of tracking updated representative points. Likewise, a result of tracking the end tracking points includes a result of tracking updated representative points.

3. Endoscope System, Training Device, and Trained Model

The output from the above tracking device 200 may be used for machine learning. During an endoscopic surgery, an operator may find it difficult to discern an object whose position and shape is not clearly displayed in an image. One possible case is that, while an operator carries out a procedure with reference to a predetermined landmark during an endoscopic surgery, the position and shape of the landmark is not clearly displayed in an image. In this case, it may be difficult for an unskilled surgeon to discern such an unclear landmark. Note that the term "position and shape" herein refers to a position and a shape.

Figure 12A:
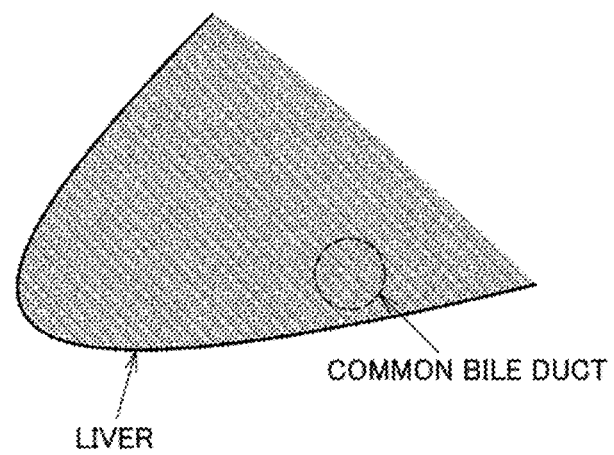
FIGS. 12A-12C each illustrate an example of an object whose position and shape is not clearly displayed in an image.
Figure 12B:
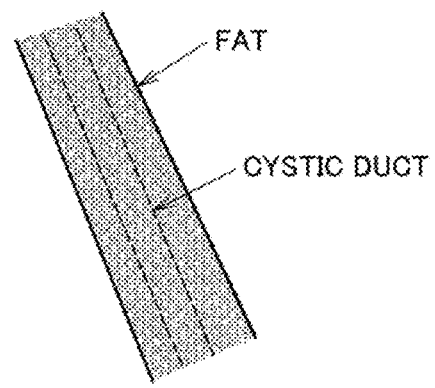
Figure 12C:
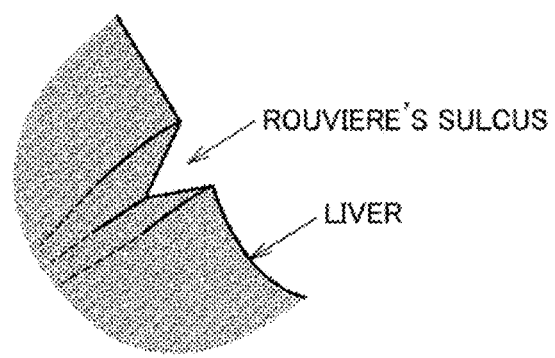

FIGS. 12A-12C each illustrate an example of an object whose position and shape is not clearly displayed in an image. The object in FIG. 12A is the common bile duct, the object in FIG. 12B is the cystic duct, and the object in FIG. 12C is Rouviere's sulcus. It should be noted that FIGS. 12A-12C are schematic and are not intended to show the precise shapes of actual organs or tissues. This holds for FIG. 14 and the subsequent figures.

FIGS. 12A and 12B each show a case where the object is covered with an organ or tissue. In this case, even when the object is within the angle of view of a camera, the object itself is not visible in an image, or its position and shape is not clear in an image. FIG. 12C shows a case where an object is exposed and visible in an image but its boundary is blurred. As shown in FIG. 12C, Rouviere's sulcus is visible in an endoscope image in a laparoscopic cholecystectomy, with the origin of the sulcus being relatively clear. However, Rouviere's sulcus, which gradually disappears toward its end, has a blurred boundary.

The common bile duct, the cystic duct, Rouviere's sulcus, and a lower edge of the S4 segment (described later) are landmarks in a laparoscopic cholecystectomy. The landmarks serve as reference guides for performing a surgical procedure. The exemplary embodiment creates training data by annotating these landmarks as objects, and performs machine learning using the training data.

Figure 13:
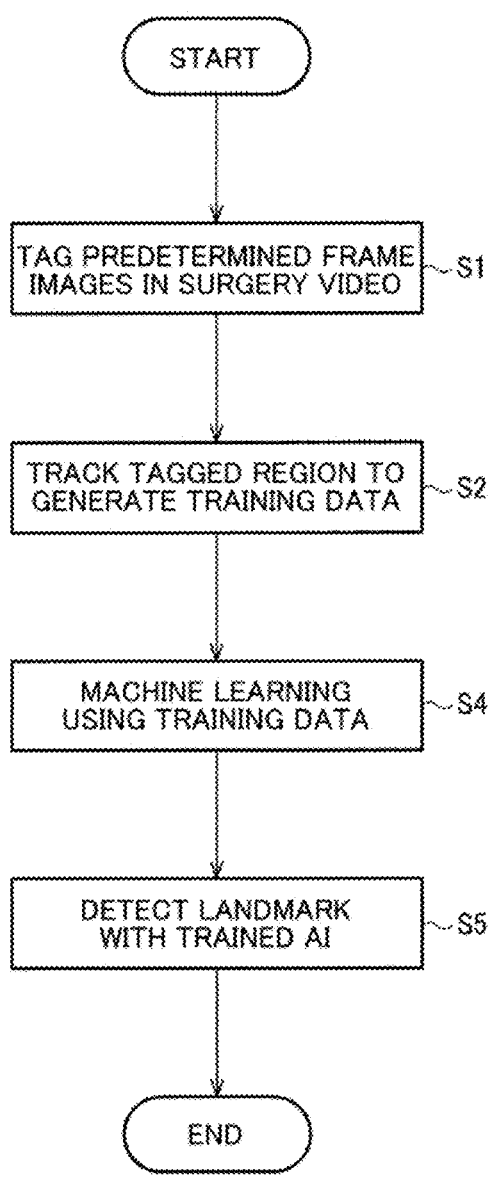
FIG. 13 is a flowchart showing a series of procedures from creation of training data to detection of objects.

FIG. 13 is a flowchart of a series of procedures from creation of training data to detection of objects in accordance with the exemplary embodiment.

Steps S1, S2 relate to creation of training data. At step S1, an operator tags predetermined frame images in a surgery video. The operator is, e.g., a surgeon experienced in the surgery in question. As will be described later, the predetermined frame images include a first frame image after a scene change in the video and a frame image immediately before the first frame image. Alternatively, the predetermined frame images include frame images selected at predetermined intervals. At step S2, the tracking device 200 tracks the tagged region to create training data. The specific tracking method is the same as in the above. Those frame images in the surgery video that have been tagged at steps S1, S2 serve as training images. Note that the process of tagging an image is called annotation.

Step S4 is a training step. That is, a training device performs machine learning using the training data created at steps S1, S2. A trained model generated from this machine learning is stored in a storage section 7 of an information processing system 10 (described later).

Step S5 is a step of making an inference with the trained AI. That is, a processing section 4 of the information processing system 10 detects an object in a detection image based on the trained model stored in the storage section 7. The processing section 4 causes information indicative of the detected object to be displayed in the detection image.

Now a description will be given of a method for creating the training data. To create the training data, an annotation indicating the position and shape of an object is appended to each training image that captures, within the angle of view thereof, an object whose position and shape is not clearly displayed in the image. The phrase "position and shape is not clearly displayed in the image" means a situation in which the position and shape of the object cannot be identified by any boundary detection method based on luminance or contrast.

For each of the aforementioned landmarks whose position and shape is not clearly displayed in an image, an operator identifies such position and shape in an image and appends this information as annotation data, based on his/her tacit knowledge. The operator who conducts the annotation is, for example, a surgeon having sufficient tacit knowledge in laparoscopic cholecystectomy.

FIG. 14 illustrates an example of annotation. A training image before annotation captures a liver KZ, a gallbladder TNN, and treatment tools TL1, TL2. The common bile duct, the cystic duct, the Rouviere's sulcus, and a lower edge of the S4 segment are within the angle of view of this training image. In FIG. 14, solid lines in the right lobe of the liver indicate the origin (a relatively clear portion) of the Rouviere's sulcus, and dotted lines in the right lobe indicate that the sulcus gradually disappears toward its end. A dotted line near an inner lower edge of the left lobe of the liver indicates a region of the lower edge of the S4 segment, which is an object that is visible in an image but whose boundary is blurred.

An operator who performs the annotation discerns and tags each of the common bile duct, the cystic duct, the Rouviere's sulcus, and the lower edge of the S4 segment in each training image. A training image after the annotation is tagged with a tag TGA indicating the common bile duct, a tag TGB indicating the cystic duct, a tag TGC indicating the Rouviere's sulcus, and a tag TGD indicating the lower edge of the S4 segment. For example, the operator specifies regions of the common bile duct and other aforementioned objects with a pointing device, such as a mouse or a touch panel. The training device tags the regions in the training image specified by the operator.

Figure 15:
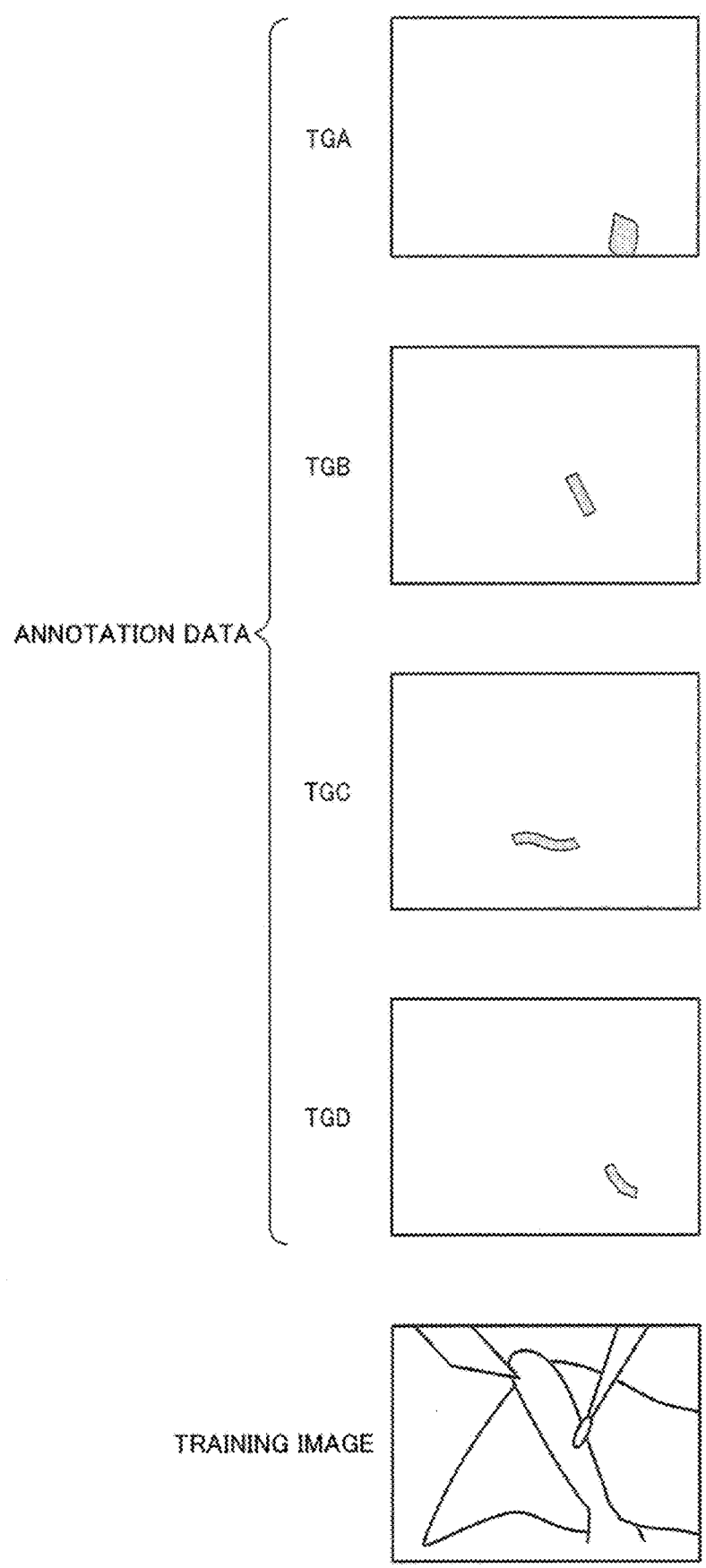
FIG. 15 illustrates an example of training data generated based on annotation.

FIG. 15 illustrates an example of training data generated by the annotation. As shown in FIG. 15, pixels of the tagged region are marked with a flag. This map data in which the pixels are marked with a flag is hereinafter referred to as flag data (annotation data). The flag data is generated for each of the tags TGA-TGD. That is, the training data is composed of a training image and four layers of flag data generated by tagging the training image.

Figure 16:
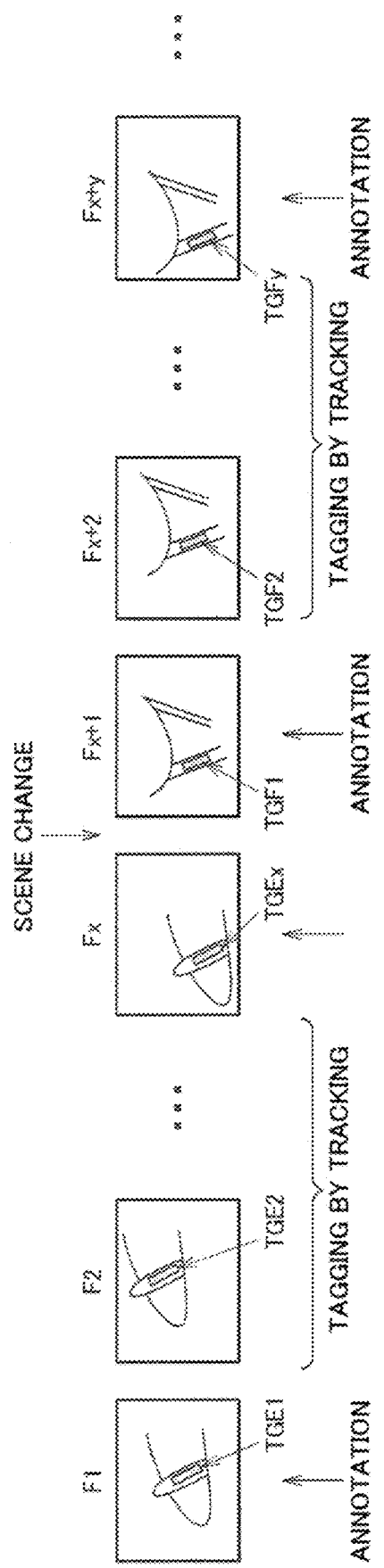
FIG. 16 explains automatic tagging by tracking.

FIG. 16 explains automatic tagging by tracking. FIG. 16 illustrates frame images of a video captured by an endoscopic scope 2. Each of these frame images serves as a training image. Predetermined frame images F1, Fx, Fx+1, and Fx+y are selected from the video. Note that x is an integer not less than 1. The operator may select the predetermined frame images F1, Fx, Fx+1, and Fx+y, or the training device may select the predetermined frame images F1, Fx, Fx+1, and Fx+y by means of e.g., scene detection through image processing. The operator tags the thus selected predetermined frame images F1, Fx, Fx+1, and Fx+y.

For example, the predetermined frame images F1, Fx+1 are those taken when a surgery proceeds to a next step, when brightness/darkness of the video has changed, when interframe blurring has greatly changed, or when an object to be captured has been switched to another object. The frame images Fx, Fx+y are those taken immediately before any of these events takes place, such as immediately before the surgery proceeds to a next step. The frame images F1, Fx+1 each correspond to the start frame, and the frame images Fx, Fx+y each correspond to the end frame.

Frame images between the tagged start and end frames are tagged by tracking. Assume that the operator tags the frame image F1 with a tag TGE1 and tags the frame image Fx with a tag TGEx. In this case, frame images F2 to Fx-1 are to be tagged by tracking. For example, a tag TGE2$f$ of the frame image F2 is obtained by tracking the tag TGE1 across the frame images F1 and F2. Specifically, the tag TGE2$f$ is obtained based on the above-described processes of extracting representative points, tracking the representative points, removing outliers, generating a closed curve, and generating a tag region. Likewise, tags TGE3$f$ to TGEx$f$ each corresponding to a forward mask image are generated for the frame images F3 to Fx. Also, a tag TGEx-1$b$ of the frame image Fx-1 is obtained by tracking the tag TGEx across the frame images Fx and Fx-1. Likewise, tags TGE1$b$ to TGEx-2$b$ each corresponding to a backward mask image are generated for the frame images F1 to Fx-2. The tags TGE2 to TGEx-1 represent combined mask images obtained by combining the tags TGE2$f$ to TGEx-1$f$ and the tags TGE2$b$ to TGEx-1$b$, respectively.

Similarly, assume that the operator tags the frame image Fx+1 after the scene change with a tag TGF1 and tags the frame image Fx+y with a tag TGFy. The frame images Fx+2 to Fx+y-1 are respectively tagged with tags TGF2 to TGFy-1 by tracking, in the same manner as above. Note that y is an integer not less than 1.

In the case of FIG. 16, the start frame is the frame in which a scene change has been detected, and the end frame is the frame immediately before a frame in which a next scene change takes place. However, the section to be tracked is not necessarily set based on scene changes. For example, the operator may tag frame images at predetermined time intervals. In this case, absence of events such as switching between captured targets allows use of a single frame as both of a start frame and an end frame. For example, a frame tagged by an operator can be an end frame in a given tracking section and can also be a start frame in the next tracking section.

Figure 17:
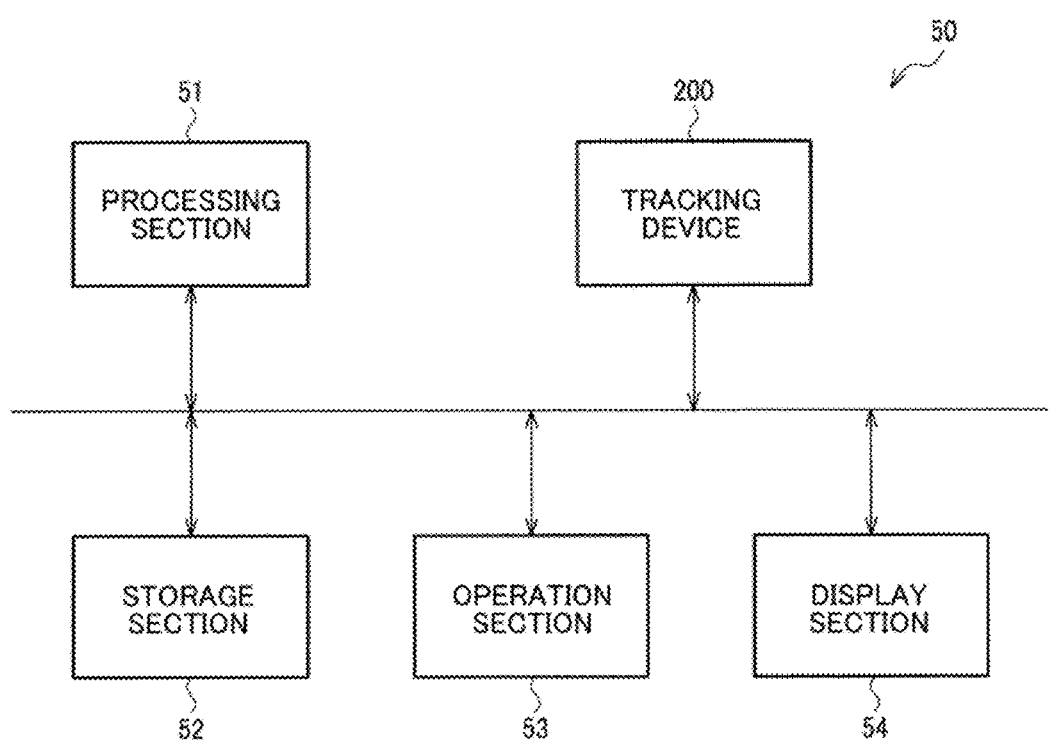
FIG. 17 illustrates a configuration example of a training device.

FIG. 17 illustrates a configuration example of a training device 50. The training device 50 includes the tracking device 200, a processing section 51, a storage section 52, an operation section 53, and a display section 54. For example, the training device 50 is an information processing device such as a PC. The processing section 51 is a processor such as a CPU. The processing section 51 performs machine learning on a training model to generate a trained model. The storage section 52 is a storage device such as a semiconductor memory or a hard disk drive. The operation section 53 includes various kinds of operation input devices such as a mouse, a touch panel, and a keyboard. The display section 54 is a display device such as a liquid crystal display. Note that the training device 50 includes the tracking device 200 in FIG. 17, but the training device 50 and the tracking device 200 may be separate devices.

Figure 18:
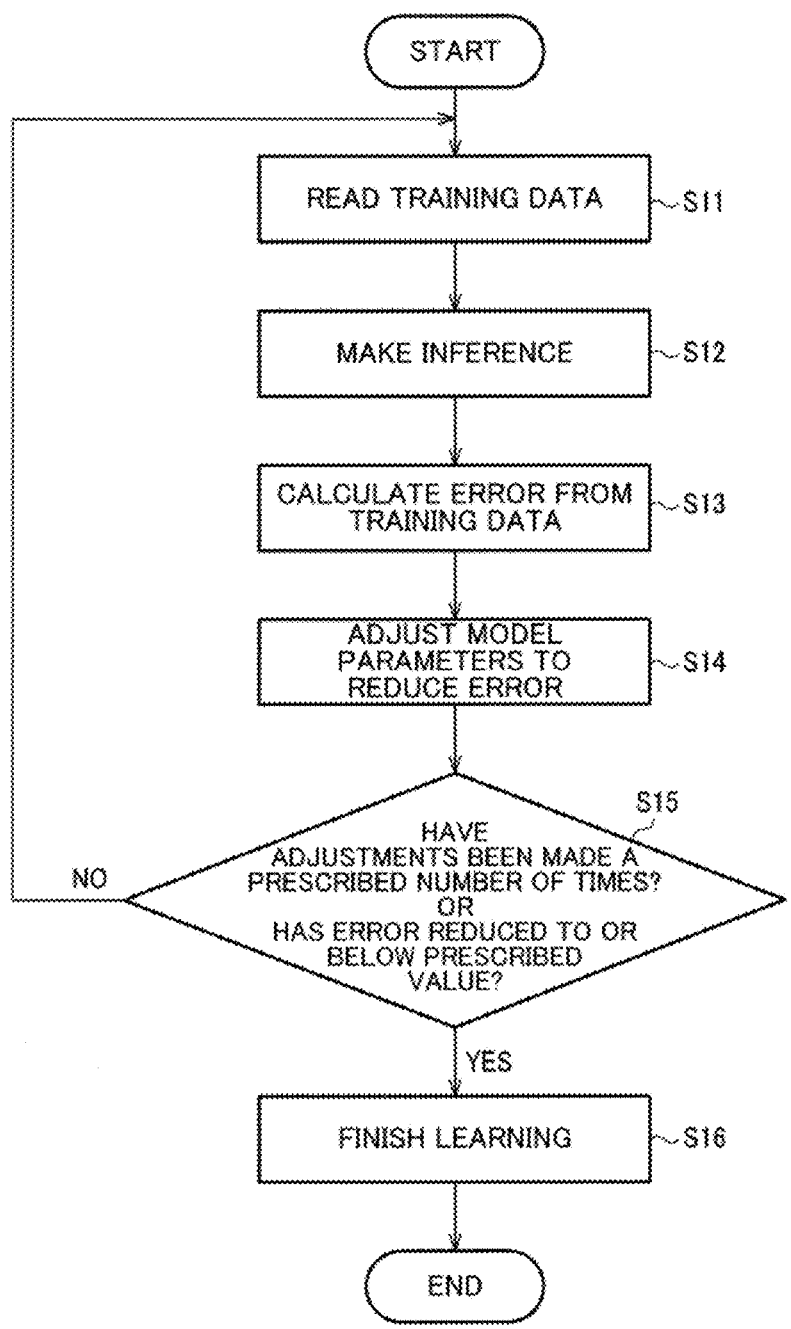
FIG. 18 is a flowchart showing a training procedure.

FIG. 18 is a flowchart showing a training procedure. Note that the annotation data (flag data) generated by the tracking device 200 is associated with corresponding training images and stored in the storage section 52 as training data.

Figure 19:
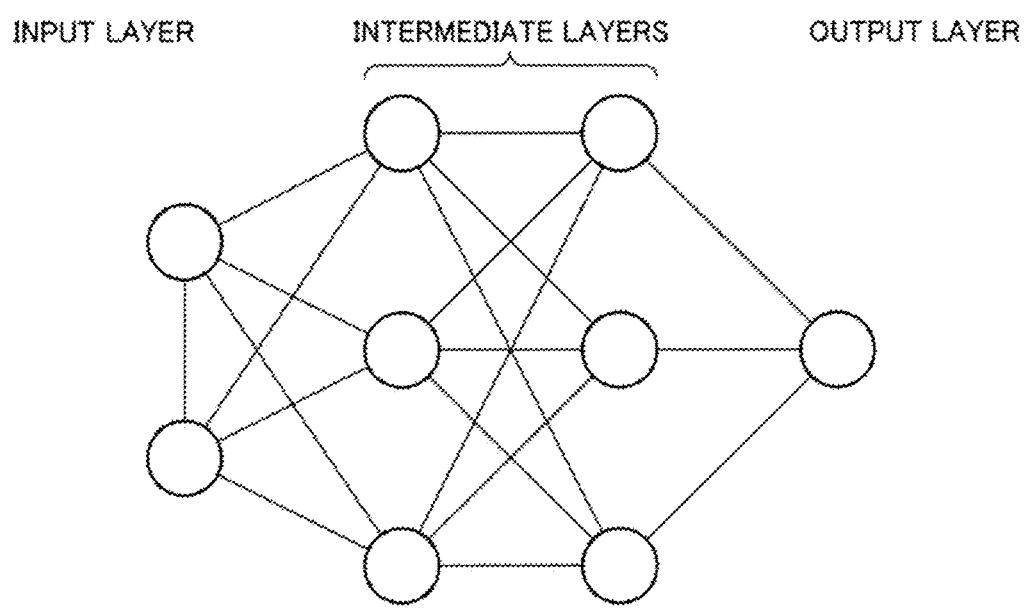
FIG. 19 illustrates an example of a neural network.

The machine learning in the exemplary embodiment may use a neural network. FIG. 19 schematically explains a neural network. A neural network consists of an input layer to which data is input, an intermediate layer(s) that performs operations based on an output from the input layer, and an output layer that outputs data based on an output from the intermediate layer(s). While the network illustrated in FIG. 19 includes two intermediate layers, the number of intermediate layers may be one or more than two. Also, the number of nodes (neurons) included in each layer is not limited to that shown in FIG. 19 and may be modified in various ways. For better accuracy, the training in the exemplary embodiment is preferably deep learning using a multi-layer neural network. The multi-layer as referred to here is four or more layers in a narrow sense.

As shown in FIG. 19, a node included in a given layer is connected to nodes in an adjacent layer(s). Each connection between the nodes is weighted. Each node multiplies every output from the preceding nodes by their weights, and sums the products. Each node further adds a bias to the sum and applies an activation function to the addition result to generate its output. This processing is sequentially performed from the input layer to the output layer, generating an output from the neural network. Training in the neural network is the process of determining appropriate weights (including biases). Various training methods, including backpropagation, are known and generally applicable to the exemplary embodiment.

More specifically, the neural network in the exemplary embodiment is a convolutional neural network (CNN), which is suitable for image recognition processing. A CNN includes convolutional layers that perform a convolution operation and pooling layers. Each convolutional layer performs a filter process. Each pooling layer performs a pooling operation for reducing the size vertically and horizontally. An output layer of the CNN is, for example, well-known softmax layer. The specific configuration of the CNN, including the number of convolutional layers, the number of pooling layers, and forms or types of the output layer, may be modified in various ways. The weight on each convolutional layer in the CNN is a filter parameter. In other words, the training by the CNN includes training of filters used for convolution operations. Since the neural network, including the CNN, is a widely known method, further description thereof is omitted. It should be noted that the machine learning in the exemplary embodiment is not limited to one using the neural network. For example, various well-known machine learning methods, such as support vector machine (SVM), or machine learning methods developed therefrom are generally applicable as the method of the exemplary embodiment.

At step S11, the processing section 51 reads the training data from the storage section 52. For example, the processing section 51 reads one training image and its corresponding flag data for one inference. Alternatively, multiple training images and their corresponding flag data may be read for one inference.

At step S12, the processing section 51 estimates the position and shape of an object and outputs the result. That is, the processing section 51 inputs the training image to the neural network. The processing section 51 performs an inference process using the neural network and outputs flag data indicating the position and shape of the object.

At step S13, the processing section 51 compares the estimated position and shape with the position and shape indicated by annotation, and calculates an error based on the comparison result. That is, the processing section 51 calculates an error between the flag data output from the neural network and the flag data included in the training data.

At step S14, the processing section 51 adjusts model parameters of the training model to reduce the error. That is, the processing section 51 adjusts, for example, weight coefficients between the nodes in the neural network, based on the error obtained at step S13.

At step S15, the processing section 51 determines whether parameter adjustments have been made a prescribed number of times. If parameter adjustments have not been made a prescribed number of times, the processing section 51 performs steps S11-S15 again. If parameter adjustments have been made a prescribed number of times, the processing section 51 finishes the learning process as shown in step S16. Alternatively, the processing section 51 determines whether the error obtained at step S13 has reduced to or below a prescribed value. If the error has not reduced to or below a prescribed value, the processing section 51 performs steps S11-S15 again. If the error has reduced to or below a prescribed value, the processing section 51 finishes the training process as shown in step S16. Through execution of the above processes, the processing section 51 outputs a trained model as a training result.

Figure 20:
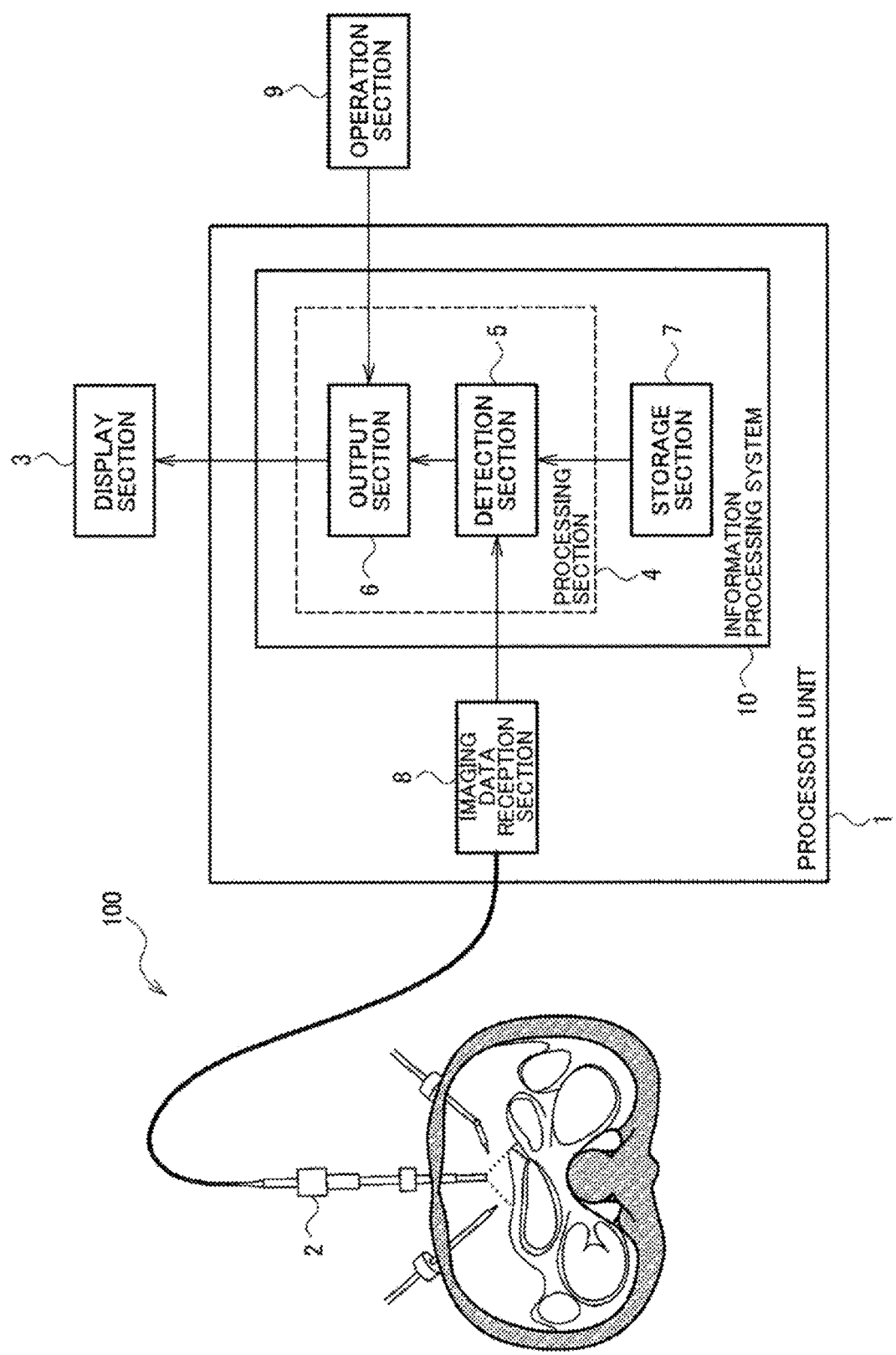
FIG. 20 illustrates a configuration example of an endoscope system including an information processing system.

FIG. 20 illustrates a configuration example of an information processing system 10 and an endoscope system 100 including the information processing system 10. The information processing system 10 is an inference device that performs an inference process using a trained model. The endoscope system 100 includes a processor unit 1, an endoscopic scope 2, and a display section 3. The endoscope system 100 may further include an operation section 9.

The endoscopic scope 2 is provided at its distal end with an imaging device, and the distal end is inserted into an abdominal cavity. The imaging device captures images inside the abdominal cavity, and the image data is transmitted from the endoscopic scope 2 to the processor unit 1.

The processor unit 1 performs various processes in the endoscope system 100. For example, the processor unit 1 controls the endoscope system 100 and performs image processing. The processor unit 1 includes an imaging data reception section 8 and the information processing system 10. The imaging data reception section 8 receives imaging data from the endoscopic scope 2. The information processing system 10 detects objects in the imaging data using a trained model.

The imaging data reception section 8 is, for example, a connector mated with a cable of the endoscopic scope 2 or an interface circuit configured to receive the imaging data.

The information processing system 10 includes a storage section 7 storing a trained model and a processing section 4 to detect objects in an image based on the trained model stored in the storage section 7.

The storage section 7 is a storage device such as a semiconductor memory, a hard disk drive, or an optical disk drive, for example. The storage section 7 stores a trained model in advance. In an alternative embodiment, a trained model may be input from an external device such as a server to the information processing system 10 via a network and stored in the storage section 7.

The processing section 4 includes a detection section 5 and an output section 6. The detection section 5 detects objects in an image by means of inference using the trained model. Based on the detection results, the output section 6 superimposes object information on the image and causes the display section 3 to display the image. Various kinds of hardware can be contemplated to make an inference based on the trained model. For example, the detection section 5 is a general-purpose processor such as a CPU. In this case, the storage section 7 stores, as the trained model, a program describing an inference algorithm and parameters used for the inference algorithm. Alternatively, the detection section 5 may be a dedicated processor with a hard-wired inference algorithm. In this case, the storage section 7 stores parameters used for the inference algorithm as the trained model. A neural network may be applied to the inference algorithm. In this case, weight coefficients between connected nodes in the neural network are the parameters.

The detection section 5 inputs a detection image captured by the endoscopic scope 2 to the trained model. The detection section 5 detects the position and shape of each object in the detection image through the detection process using the trained model. In other words, the detection result is output as detection flag data. The detection flag data is a flag map in which pixels corresponding to the position and shape of each detected object are flagged. For example, four-layer detection flag data corresponding to each object is output, which is similar to the training data explained with reference to FIG. 15.

The display section 3 is a monitor that displays images output from the output section 6. Examples of the display section 3 include display devices such as a liquid crystal display and an organic electroluminescence (EL) display.

The operation section 9 is a device that allows an operator to operate the endoscope system 100. Examples of the operation section 9 include buttons, dials, a foot switch, and a touch panel. As will be described later, the output section 6 may change an object display mode, based on input information from the operation section 9.

While in the above configuration the information processing system 10 is included in the processor unit 1, a part or whole of the information processing system 10 may be external to the processor unit 1. For example, the storage section 7 and the detection section 5 may be implemented by an external processing device such as a PC or a server. In this case, the imaging data reception section 8 transmits the imaging data to the external processing device via a network or the like. The external processing device transmits information indicating detected objects to the output section 6 via the network or the like. The output section 6 superimposes the received information on the corresponding images and causes the display section 3 to display the images.

The method of the exemplary embodiment may be applied to a trained model for causing a computer to receive a detection image as input, detect a position of a given subject in the detection image, and output a detection result. The trained model is trained by machine learning based on training data in which frame images included in a video are associated with annotation data generated by the above tracking method. All frame images included in the video may be associated with annotation data. However, the manner of associating the frame images in the video with annotation data in the exemplary embodiment is not limited to the one mentioned above, and not all but some of the frame images in the video may be associated with annotation data. In this case, machine learning is performed using those frame images associated with annotation data.

The tracking method of the exemplary embodiment performs accurate tracking based on a tagged region appended to an object in a video, which enables creation of highly accurate annotation data. Through machine learning using such annotation data as training data, it is possible to generate a trained model that is able to execute highly accurate detection of objects.

The method of the exemplary embodiment is also applicable to the endoscope system 100 including the storage section 7 that stores the above trained model, the endoscopic scope 2 that captures detection images, and the processing section 4 that detects a position of a given subject in each detection image based on the trained model.

This configuration enables accurate detection of a desired subject in the detection images. In particular, in the case of objects whose position and shape is not clearly displayed in an image, this configuration performs machine learning using training data in which such objects are annotated, and thereby enables detection of such objects based on tacit knowledge of skilled surgeons and other experts. As the training data can be generated by tracking, it is possible to ease the burden on surgeons and other experts in charge of annotation.

Although the embodiments to which the present disclosure is applied and the modifications thereof have been described in detail above, the present disclosure is not limited to the embodiments and the modifications thereof, and various modifications and variations in components may be made in implementation without departing from the spirit and scope of the present disclosure. The plurality of elements disclosed in the embodiments and the modifications described above may be combined as appropriate to implement the present disclosure in various ways. For example, some of all the elements described in the embodiments and the modifications may be deleted. Furthermore, elements in different embodiments and modifications may be combined as appropriate. Thus, various modifications and applications can be made without departing from the spirit and scope of the present disclosure. Any term cited with a different term having a broader meaning or the same meaning at least once in the specification and the drawings can be replaced by the different term in any place in the specification and the drawings.

What is claimed is:

1. A tracking device comprising:
a processor including hardware,
the processor being configured to:
set a start frame and an end frame in a video including multiple frames;
perform forward tracking of tracking a tracking target in a forward direction in frames subsequent to the start frame based on a region of the tracking target in the start frame;
perform backward tracking of tracking the tracking target in a backward direction in frames previous to the end frame based on a region of the tracking target in the end frame; and
generate a combined mask image indicating a region of the tracking target in each of the frames in which the forward tracking and the backward tracking have been performed by combining a forward mask image based on the forward tracking with a backward mask image based on the backward tracking,
wherein the processor performs a display process of superimposing the combined mask image on the video such that a non-overlapping portion where the forward mask image and the backward mask image do not overlap each other in the combined mask image has a higher transparency than an overlapping portion where the forward mask image and the backward mask image overlap each other in the combined mask image.

2. The tracking device as defined in claim 1, wherein the region of the tracking target in the start frame and the region of the tracking target in the end frame are set based on tagging data added to the tracking target.

3. The tracking device as defined in claim 1, wherein the processor
sets weight information that causes the forward mask image to be weighted more than the backward mask image in a frame closer to the start frame,
sets the weight information that causes the backward mask image to be weighted more than the forward mask image in a frame closer to the end frame, and
generates the combined mask image by combining the forward mask image with the backward mask image based on the weight information.

4. The tracking device as defined in claim 1, wherein the processor
applies the forward mask image as the combined mask image in a predetermined number of frames subsequent to the start frame, and
applies the backward mask image as the combined mask image in a predetermined number of frames previous to the end frame.

5. The tracking device as defined in claim 1, wherein the processor
extracts start tracking points from a contour of the tracking target in the start frame and performs the forward tracking based on the extracted start tracking points, and
extracts end tracking points from a contour of the tracking target in the end frame and performs the backward tracking based on the extracted end tracking points.

6. The tracking device as defined in claim 5, wherein the forward mask image is an image identifying a region inside a closed curve that connects a plurality of points as a result of tracking the start tracking points, and
the backward mask image is an image identifying a region inside a closed curve that connects a plurality of points as a result of tracking the end tracking points.

7. The tracking device as defined in claim 1, wherein the processor combines the forward mask image with the backward mask image based on a weighting coefficient that is dependent on a frame position in the video and a pixel position in an image.

8. The tracking device as defined in claim 7, wherein
the processor generates the combined mask image using a forward weighting coefficient wf and a backward weighting coefficient wb and based on the following expression:

$$I(t,x)=wf(t,x){\times}If(t,x)+wb(t,x){\times}Ib(t,x)$$

where x is the pixel position, t is the frame position, I is the combined mask image, If is the forward mask image, and Ib is the backward mask image.

9. A tracking method comprising:
setting a start frame and an end frame in a video including multiple frames;
performing forward tracking of tracking a tracking target in a forward direction in frames subsequent to the start frame based on a region of the tracking target in the start frame;
performing backward tracking of tracking the tracking target in a backward direction in frames previous to the end frame based on a region of the tracking target in the end frame;
generating a combined mask image indicating a region of the tracking target in each of the frames in which the forward tracking and the backward tracking have been performed by combining a forward mask image based on the forward tracking with a backward mask image based on the backward tracking; and
performing display process of superimposing the combined mask image on the video such that a non-overlapping portion where the forward mask image and the backward mask image do not overlap each other in the combined mask image has a higher transparency than an overlapping portion where the forward mask image and the backward mask image overlap each other in the combined mask image.

10. The tracking method as defined in claim 9, wherein the region of the tracking target in the start frame and the region of the tracking target in the end frame are set based on tagging data added to the tracking target.

11. The tracking method as defined in claim 9, further comprising:
setting weight information that causes the forward mask image to be weighted more than the backward mask image in a frame closer to the start frame,
setting the weight information that causes the backward mask image to be weighted more than the forward mask image in a frame closer to the end frame, and
generating the combined mask image by combining the forward mask image with the backward mask image based on the weight information.

12. The tracking method as defined in claim 9, further comprising:
applying the forward mask image as the combined mask image in a predetermined number of frames subsequent to the start frame, and
applying the backward mask image as the combined mask image in a predetermined number of frames previous to the end frame.

13. The tracking method as defined in claim 9, further comprising:
extracting start tracking points from a contour of the tracking target in the start frame and performing the forward tracking based on the extracted start tracking points, and
extracting end tracking points from a contour of the tracking target in the end frame and performing the backward tracking based on the extracted end tracking points.

14. The tracking method as defined in claim 13, wherein
the forward mask image is an image identifying a region inside a closed curve that connects a plurality of points as a result of tracking the start tracking points, and
the backward mask image is an image identifying a region inside a closed curve that connects a plurality of points as a result of tracking the end tracking points.

15. The tracking method as defined in claim 9, further comprising:
combining the forward mask image with the backward mask image based on a weighting coefficient that is dependent on a frame position in the video and a pixel position in an image.

16. The tracking method as defined in claim 15, further comprising:
generating the combined mask image using a forward weighting coefficient wf and a backward weighting coefficient wb and based on the following expression:

$$I(t,x)=wf(t,x){\times}If(t,x)+wb(t,x){\times}Ib(t,x)$$

where x is the pixel position, t is the frame position, I is the combined mask image, If is the forward mask image, and Ib is the backward mask image.

17. A tracking method comprising:
setting a start frame and an end frame in a video including multiple frames;
performing forward tracking of tracking a tracking target in a forward direction in frames subsequent to the start frame based on a region of the tracking target in the start frame;
performing backward tracking of tracking the tracking target in a backward direction in frames previous to the end frame based on a region of the tracking target in the end frame; and
generating a combined mask image indicating a region of the tracking target in each of the frames in which the forward tracking and the backward tracking have been performed by combining a forward mask image based on the forward tracking with a backward mask image based on the backward tracking, and by combining the forward mask image with the backward mask image based on a weighting coefficient that is dependent on a frame position in the video and a pixel position in an image,
wherein the generating step comprises generating the combined mask image using a forward weighting coefficient wf and a backward weighting coefficient wb and based on the following expression:

$$I(t,x)=wf(t,x){\times}If(t,x)+wb(t,x){\times}Ib(t,x)$$

where x is the pixel position, t is the frame position, I is the combined mask image, If is the forward mask image, and Ib is the backward mask image.

18. The tracking method as defined in claim 17, wherein the region of the tracking target in the start frame and the region of the tracking target in the end frame are set based on tagging data added to the tracking target.

19. The tracking method as defined in claim 17, further comprising:
setting weight information that causes the forward mask image to be weighted more than the backward mask image in a frame closer to the start frame, setting the weight information that causes the backward mask image to be weighted more than the forward mask image in a frame closer to the end frame, and generating the combined mask image by combining the forward mask image with the backward mask image based on the weight information.

20. The tracking method as defined in claim 17, further comprising:

applying the forward mask image as the combined mask image in a predetermined number of frames subsequent to the start frame, and applying the backward mask image as the combined mask image in a predetermined number of frames previous to the end frame.

\* \* \* \* \*